(12) United States Patent
Matsubara et al.

(10) Patent No.: US 6,335,812 B1
(45) Date of Patent: Jan. 1, 2002

(54) COMMUNICATION TERMINAL APPARATUS AND A METHOD

(75) Inventors: Shinzo Matsubara; Yosuke Tajika, both of Hyogo-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/151,597

(22) Filed: Sep. 11, 1998

(30) Foreign Application Priority Data

Sep. 16, 1997 (JP) .............................. 9-250668

(51) Int. Cl.[7] .............................................. H04B 10/02
(52) U.S. Cl. ....................... 359/174; 359/118; 359/152; 709/200
(58) Field of Search ................................. 359/174, 179, 359/152, 154, 164, 173, 118, 119; 709/200

(56) References Cited

U.S. PATENT DOCUMENTS

| 5,099,346 A | * | 3/1992 | Lee et al. .................... 359/118 |
| 5,771,352 A | | 6/1998 | Nakamura et al. .......... 709/227 |
| 5,818,619 A | * | 10/1998 | Medved et al. ............. 359/172 |
| 5,959,752 A | * | 9/1999 | Ota ............................ 359/152 |
| 5,966,225 A | * | 10/1999 | Taglione et al. ............ 359/152 |

OTHER PUBLICATIONS

T. Williams, et al., Infrared Data Association, pp. 2–116, "Serial Infrared Link Access Protocol (IrLAP)", Apr. 10, 1996.

* cited by examiner

*Primary Examiner*—Thomas Mullen
(74) *Attorney, Agent, or Firm*—Oblon, Spivak, McClelland, Maier & Neustadt, P.C.

(57) ABSTRACT

A communication terminal apparatus is used in a communication system including at least one first terminal having an optical communication section to optically communicate with one other first terminal and at least one second terminal having a network communication section to communicate with a plurality of other second terminals through a network. In the communication terminal apparatus as a relay terminal, an optical communication section optically communicates with the at least one first terminal. A network communication section communicates with the at least one second terminal through the network. A received information sending section sends information received from the optical communication section to the network communication section, and sends information received from the network communication section to the optical communication section.

27 Claims, 13 Drawing Sheets

| TERMILAL IDENTIFIER | ATTRIBUTE OF RECEIVING SECTION |
|---|---|
| C1 | LAN |
| C2 | LAN |
| C3 | LAN |
| Cc | IrDA |

FIG. 9

| TERMILAL IDENTIFIER | ATTRIBUTE OF RECEIVING SECTION |
|---|---|
| C2 | LAN |
| C3 | LAN |
| Cs | LAN |
| Cc | LAN |

FIG. 10

| GROUP IDENTIFIER | LIST OF PARTICIPATION TERMINAL |
|---|---|
| G1 | Cc, Cs, C1, C3 |
| G2 | C1, C2, C3 |

*FIG. 15*

| TERMILAL IDENTIFIER | ATTRIBUTE OF RECEIVING SECTION | GROUP OPERATION ATTRIBUTE |
|---|---|---|
| C1 | LAN | NORMAL MODE |
| C2 | LAN | NORMAL MODE |
| C3 | LAN | NORMAL MOBE |
| Cc | IrDA | AUTOMATIC MODE |

*FIG. 16*

COMMUNICATION TERMINAL APPARATUS AND A METHOD

FIELD OF THE INVENTION

The present invention relates to a communication terminal apparatus and a method to form a group consisting of a plurality of terminals and to mutually communicate information in the group.

BACKGROUND OF THE INVENTION

Recently, as a data communication interface in a personal computer or an information portable terminal, an optical communication of an infrared ray is used. As a standard protocol for this optical communication, IrDA (Infrared Data Association) is used.

In recent information portable terminals, the infrared ray communication function of the standard protocol "IrDA" is loaded. However, the infrared ray communication function supports a communication function of one-to-one type only. Accordingly, use the infrared ray communication function of the standard protocol "IrDA", communication among a plurality of the terminals is impossible.

In this place, assume that a relay communication between IrDA terminal and LAN (Local Area Network) terminal is executed through a relay terminal. FIG. 1 shows communication between IrDA terminal Cc and LAN terminal C1 executed through relay terminal Cs. In this case, a communication speed of IrDA is low in comparison with LAN. Therefore, if the relay terminal Cs simply transmits information from LAN to IrDA, traffic on IrDA greatly increases. As a result, packet-abolishment occurs in the IrDA terminal and transmission efficiency decreases.

Furthermore, in the prior art, the relay terminal does not multicast among a plurality of terminals including the IrDA terminal and the LAN terminal. Therefore, each terminal often receives unnecessary information. For example, in FIG. 1, the LAN terminal receives information used for the IrDA terminal only and the IrDA terminal receives information used for the LAN terminal only. In this case, the quality of each terminal goes bad.

However, the IrDA terminal is small, portable, and will be more widely used as a personal handy terminal in near future. On the other hand, in an office environment, the LAN terminal is normally used by many businessmen. Therefore, the IrDA terminal must be connected to a LAN if necessary and a transmission of information must be smoothly executed between the IrDA terminal and the LAN terminal.

As mentioned-above, even if the IrDA terminal prepares one-to-one communication function, it is necessary that the IrDA terminal is connected to the LAN network and information is smoothly communicated between the IrDA terminal and the LAN terminal. Furthermore, it is necessary that the traffic on IrDA as communication means of low transmission speed goes down and the load of operation on this network system is canceled.

SUMMARY OF THE INVENTION

It is an object of the present invention to provide a communication terminal apparatus to smoothly connect the IrDA terminal as one-to-one communication function to the LAN network system including the LAN terminals.

It is another object of the present invention to provide a communication terminal apparatus to reduce the traffic on the IrDA as communication means of low transmission speed in order to cancel the load of operation on the network system.

According to the present invention, there is provided a communication terminal apparatus used in a communication system including at least one first terminal having an optical communication means for optically communicating with one other first terminal and for sending an identifier to discriminate the at least one first terminal, and at least one second terminal having a network communication means for communicating with a plurality of other second terminals by a network and for sending an identifier to discriminate the at least one second terminal, said communication terminal apparatus being a relay terminal to communicate between the first terminal and the second terminal, comprising: an optical communication means for optically sending and receiving information with respect to the at least one first terminal; a network communication means for sending and receiving information with respect to the at least one second terminal by the network; an identifier sending means for sending an identifier to discriminate the relay terminal through said optical communication means and said network communication means; a communicatable terminal discrimination means for discriminating the terminal communicatable with the relay terminal according to identifiers received from said optical communication means and said network communication means; a communicatable terminal memory means for storing the identifiers of the communicatable terminals and an attribute representing the kind of said communication means from which each identifier is received; and a received information sending means for comparing a destination identifier of received information with the identifiers stored in said communicatable terminal memory means, and for supplying the received information to said optical communication means or said network communication means according to the attribute of the identifier matched with the destination identifier.

Further in accordance with the present invention, there is also provided a method for controlling a relay terminal used in a communication system including at least one first terminal having an optical communication means for optically communicating with one other first terminal and at least one second terminal having a network communication means for communicating with a plurality of other second terminals by a network, each terminal sends an identifier to discriminate its own terminal, comprising the steps of: optically communicating with the at least one first terminal; communicating with at least one second terminal by the network; discriminating the terminal communicatable with the relay terminal according to identifiers received from the first terminal and the second terminal; storing the identifiers of the communicatable terminals and an attribute representing the kind of communication from which each identifier is received; comparing a destination identifier of information received from the first terminal or the second terminal with the stored identifiers; and supplying the received information to the first terminal or the second terminal according to the attribute of the stored identifier matched with the destination identifier.

Further in accordance with the present invention, there is also provided a computer readable memory containing computer readable instructions to control a relay terminal used in a communication system including at least one first terminal having an optical communication means for optically communicating with one other first terminal and at least one second terminal having a network communication means for communicating with a plurality of other second terminals by a network, each terminal sends an identifier to discriminate its own terminal, comprising: instruction means for causing a computer to optically communicate with the at least one first terminal; an instruction means for causing a computer to communicate with the at least one second terminal by the network; an instruction means for causing a computer to discriminate the terminal communicatable with the relay terminal according to identifiers received from the first terminal and the second terminal; instruction means for causing a computer to store the identifiers of the communicatable terminals and an attribute representing the kind of communication from which each identifier is received; an instruction means for causing a computer to compare a destination identifier of information received from the first terminal or the second terminal with the stored identifiers; and an instruction means for causing a computer to supply the received information to the first terminal or the second terminal according to the attribute of the stored identifier matched with the destination identifier.

BRIEF DESCRIPTION OF THE DRAWINGS

FIG. 9 is a schematic diagram of a memory table in a communicatable terminal memory section of the relay terminal according to the second embodiment of the present invention.

FIG. 10 is a schematic diagram of a memory table in the communicatable terminal memory section of the LAN terminal according to the second embodiment of the present invention.

FIG. 15 is a schematic diagram of a data format in a group information memory section according to the fifth embodiment of the present invention.

FIG. 16 is a schematic diagram of a data format in the group information memory section according to a sixth embodiment of the present invention.

DETAILED DESCRIPTION OF THE PREFERRED EMBODIMENTS

Figure 1:
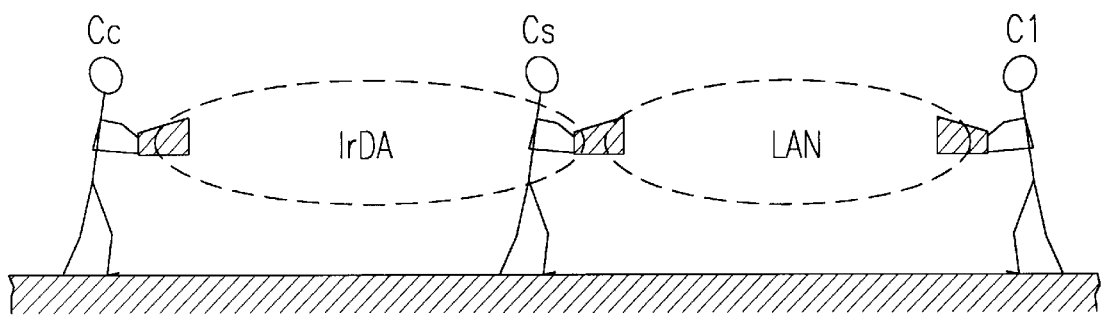
FIG. 1 is a schematic diagram of a communication system including an IrDA terminal, a LAN terminal, and a relay terminal.

Hereinafter, embodiments of the present invention will be explained by referring to the Figures. First, a first embodiment of the present invention is explained. In the first embodiment, by relaying information of the IrDA terminal which has a one-to-one communication function, the communication control apparatus (the relay terminal) reduces traffic on an IrDA and executes multicast transmission between a plurality of terminals including the IrDA terminal. In this network system, as for the IrDA terminal which has only a one-to-one communication function, communication with a plurality of LAN terminals is made possible by the relay terminal as shown in FIG. 1.

Figure 2:
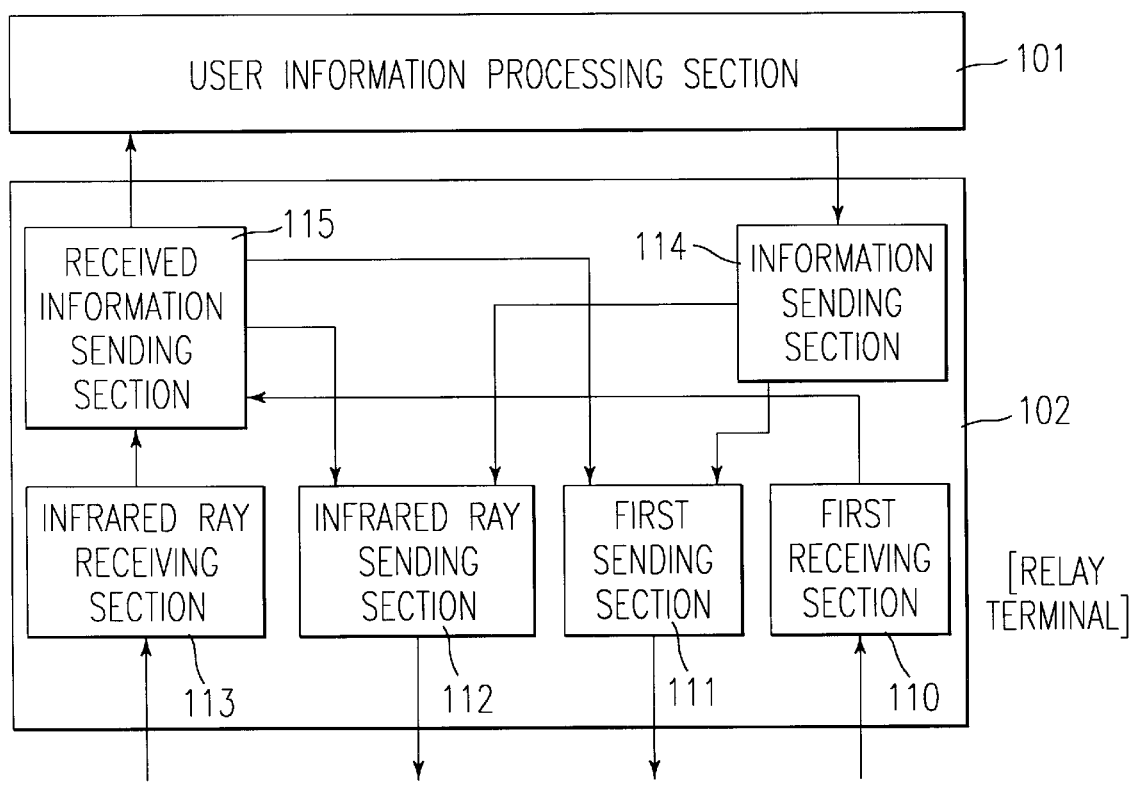
FIG. 2 is a block diagram of the relay terminal according to a first embodiment of the present invention.
Figure 3:
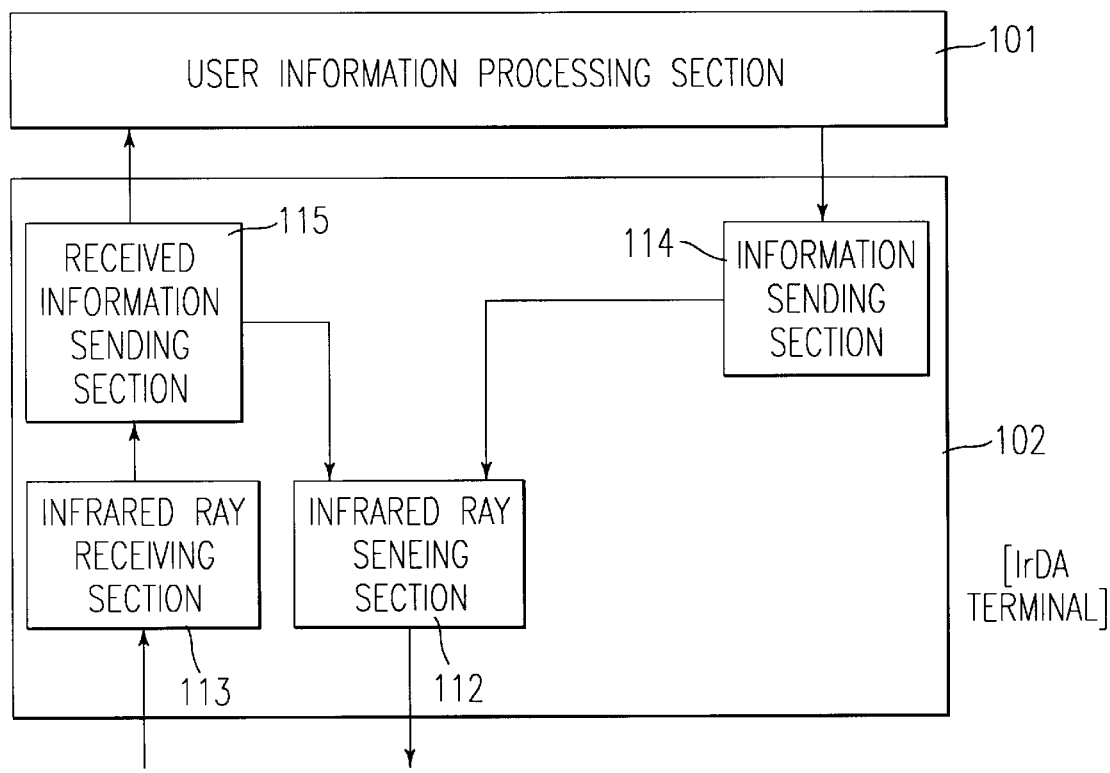
FIG. 3 is a block diagram of the IrDA terminal according to the first embodiment of the present invention.
Figure 4:
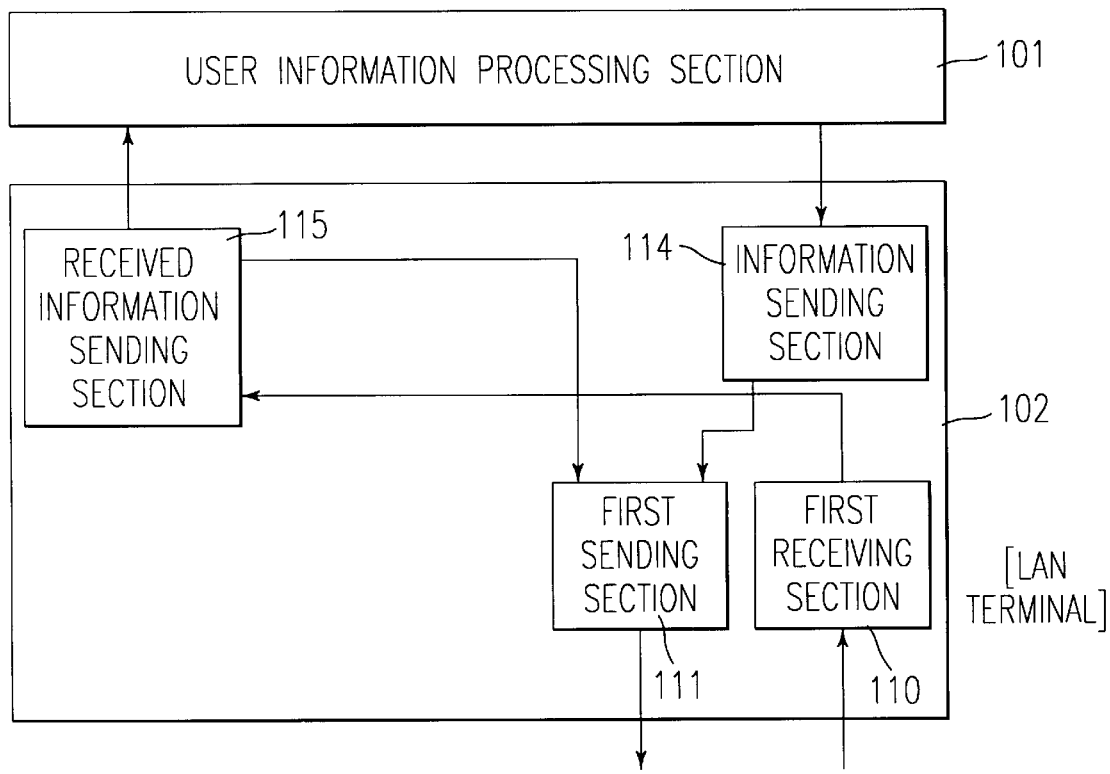
FIG. 4 is a block diagram of the LAN terminal according to the first embodiment of the present invention.

FIG. 2 is a block diagram of the relay terminal of the first embodiment; FIG. 3 is a block diagram of the IrDA terminal of the first embodiment; FIG. 4 is a block diagram of the LAN terminal of the first embodiment. As shown in FIGS. 2, 3, and 4, each terminal consists of a user information processing section 101 and a communication section 102. In the relay terminal, the communication control section 102 includes a first receiving section 110, a first sending section 111, an infrared ray sending section 112, an infrared ray receiving section 113, an information sending section 114, and a received information sending section 115. In IrDA terminal, the communication control section 102 includes the infrared ray sending section 112, the infrared ray receiving section 113, the information sending section 114, and the received information sending section 115. In the LAN terminal, the communication control section 102 includes the first receiving section 110, the first sending section 111, the information sending section 114, the received information sending section 115. These basic functions are the same, but the terminals, except for the relay terminal, prepare one of the infrared transmission means 113, 112 or the LAN transmission means 110, 111. The following explanation will be described based on the relay terminal. Accordingly, as for the IrDA terminal, the function of the infrared ray transmission is omitted from the following explanation. As for the LAN terminal, the function of the LAN transmission is omitted from the following explanation.

In the relay terminal, the information sending section 114 of the communication control section 102 supplies the sending information to a sending means. In this case, the sending information inputted by the user information processing is supplied to the first sending section 111 and the infrared ray sending section 112. The first sending section 111 is a high speed transmission means to realize a serial communication function through a transmission path, and sends the information received from the information sending section 114 and the received information sending section 115. The infrared ray sending section 112 includes an infrared ray optical source, which sends the information as an infrared ray signal by driving the infrared ray optical source. In short, the information received from the information sending section 114 and the received information sending section 115 is sent by wireless transmission of the infrared ray signal. The infrared ray receiving section 113 includes a light receiving element for photoelectric conversion, and outputs the infrared ray signal received through a wireless transmission as electric signal. The first receiving section 110 receives the signal transmitted through a signal transmission path to realize a serial communication function. The first receiving section 110 and the infrared ray receiving section 113 supply the information to the received information sending section 115. If a destination address of the received information supplied from the first receiving section 110 or the infrared ray receiving section 113 represents the relay terminal (own terminal), the received information sending section 115 outputs the received information to the user information processing section 101, and supplies the received information to the first sending section 111 or the infrared ray sending section 112. If the destination addresses does not represent the own terminal, the received information is directly supplied to the first sending section 111 or the infrared ray sending section 112 without supplying the information to the user information processing section 101. The user information processing section 101 executes an application program for the received information.

Basically, the relay terminal includes both a wireless communication function of a low speed optical communication function by IrDA as one-to-one transmission and a LAN communication function of a high speed wired (or wireless) communication function by multicast transmission. In short, the relay terminal interconnects the IrDA optical communication and the high speed communication of the LAN. In the network system of the following embodiments, assume that the core system is a wireless LAN and the terminal is a moving terminal. However, the present invention may be applied to a LAN including a fixed terminal or a LAN including the fixed terminal and the moving terminal, or a wired LAN. Furthermore, the present invention may be used for the communication network except for LAN.

Figure 5:
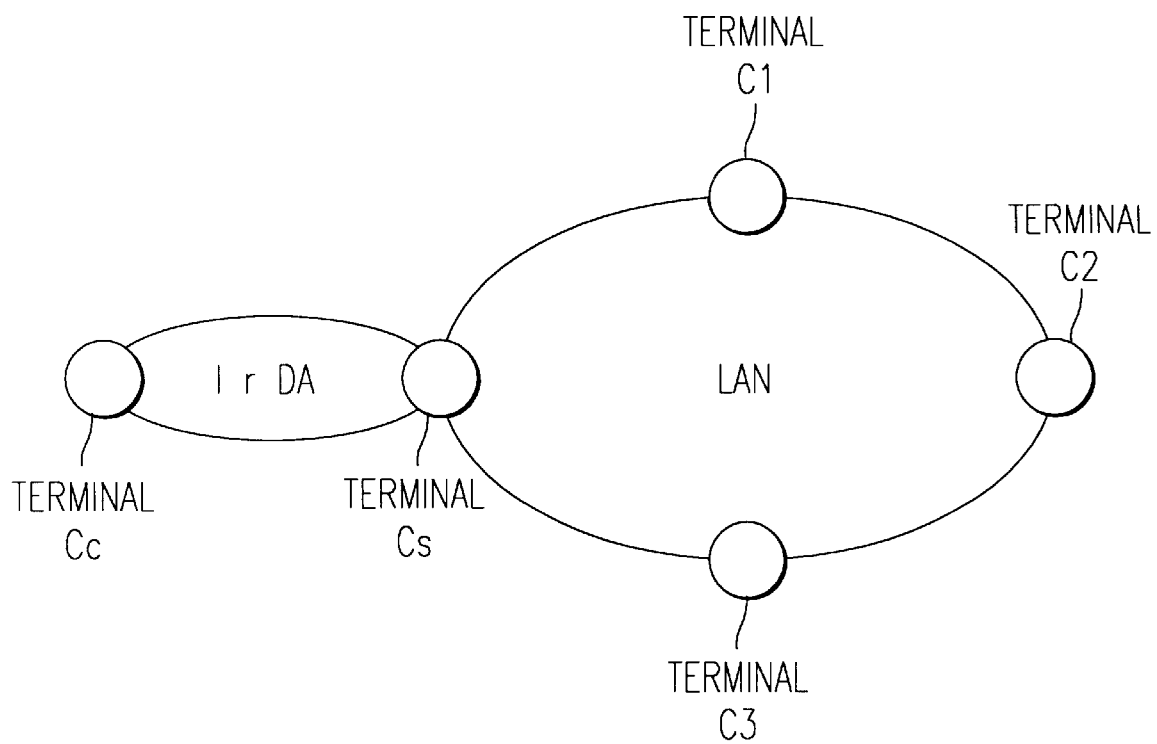
FIG. 5 is a schematic diagram illustrating use of a communication system according to the present invention.

Next, a processing of the received information sending section 115 of the first embodiment is explained by referring to FIG. 5. In FIG. 5, five terminals C1, C2, C3, Cs, Cc exist and the terminals Cs, C1, C2, C3 comprise a LAN communicatable mutually. The relay terminal Cs includes construction of FIG. 2 to prepare both the optical communication function of IrDA and the serial communication function of LAN. Four terminals Cs, C1, C2, C3 are connected to the LAN transmission path to execute the serial communication function to deliver data through the transmission path. However, three terminals C1, C2, C3 do not prepare the optical communication function of the IrDA.

The terminal Cc is not connected to LAN network, and prepares the optical communication function of the IrDA.

As mentioned-above, the relay terminal Cs includes both the serial communication function through LAN network and the optical communication function through the IrDA function, in order to relay between the IrDA terminal Cc and the LAN terminals C1, C2, C3. Accordingly, the IrDA terminal Cc can communicate the LAN terminals C1, C2, C3 through the relay terminal Cs. In the network system, the relay terminal Cs executes LAN communication to the terminals C1, C2, C3 through the first sending section 111 and the first receiving section 110, and executes a one-to-one IrDA communication to the terminal Cc through the infrared ray sending section 112 and the infrared ray receiving section 113. In short, the relay terminal Cs relays between the received information from the LAN terminal and the received information from IrDA terminal by the received information sending section 115. Therefore, a processing of the received information sending section 115 of the relay terminal Cs is explained.

In the relay terminal Cs, when the first receiving section 110 receives the information from LAN terminals C1, C2, C3, the received information is supplied to the received information sending section 115. If the destination address of the received information represents the relay terminal Cs, the received information sending section 115 supplies the received information to the user information processing section 101 and the infrared ray sending section 112. If the destination address of the received information does not represent the relay terminal, the received information is supplied to the infrared ray sending section 112. The infrared ray sending section 112 optically sends the received information as wireless by IrDA protocol. In the relay terminal, when the infrared ray receiving section 113 receives an information from IrDA terminal Cc, the information is supplied to the received information sending section 115. If the destination address represents the relay terminal, the received information sending section 115 supplies the received information to the user information processing section 101 and the first sending section 111. If the destination address does not represent the relay terminal, the received information is supplied to the first sending section 111.

The first sending section 111 sends the received information to LAN terminals C1, C2, C3. When the infrared ray sending section 112 of the relay terminal Cs receives a request of information to send above a predetermined speed from the received information sending section 115 or the information sending section 114, the infrared ray sending section 112 may store and send the sending information below the predetermined speed.

As mentioned-above, in the first embodiment, the relay terminal prepares both LAN communication function and IrDA optical communication function, and includes a transfer function (relay function) to send the information received from IrDA terminal to LAN terminal. Data relay between the IrDA terminal and the LAN terminal is executed. In short, as for a one-to-one communicatable terminal such as an IrDA, this terminal can commonly communicate with a plurality of terminals connected to another network.

(The Second Embodiment)

In the first embodiment, an information irrelevant to IrDA terminal may be sent to the IrDA terminal through the relay terminal. In general, the communication speed of the IrDA side is lower than the LAN side. If useless transmission is executed from a LAN terminal (high speed network) to an IrDA terminal (low speed network), the load of the relay terminal and the transmission quantity of network increases. Additionally, loads of LAN terminals and IrDA terminal increase. Therefore, a second embodiment to improve this defect is explained.

In the second embodiment, the relay terminal Cs understands communication resources useful for LAN terminal and IrDA terminal. In short, the information irrelevant to IrDA side is not relayed to the IrDA side and information irrelevant to the LAN side is not relayed to the LAN side. Each terminal detects the receipt of an unnecessary packet and excludes useless use of the communication resource. Loads of IrDA terminal and LAN terminals greatly decrease.

Figure 6:
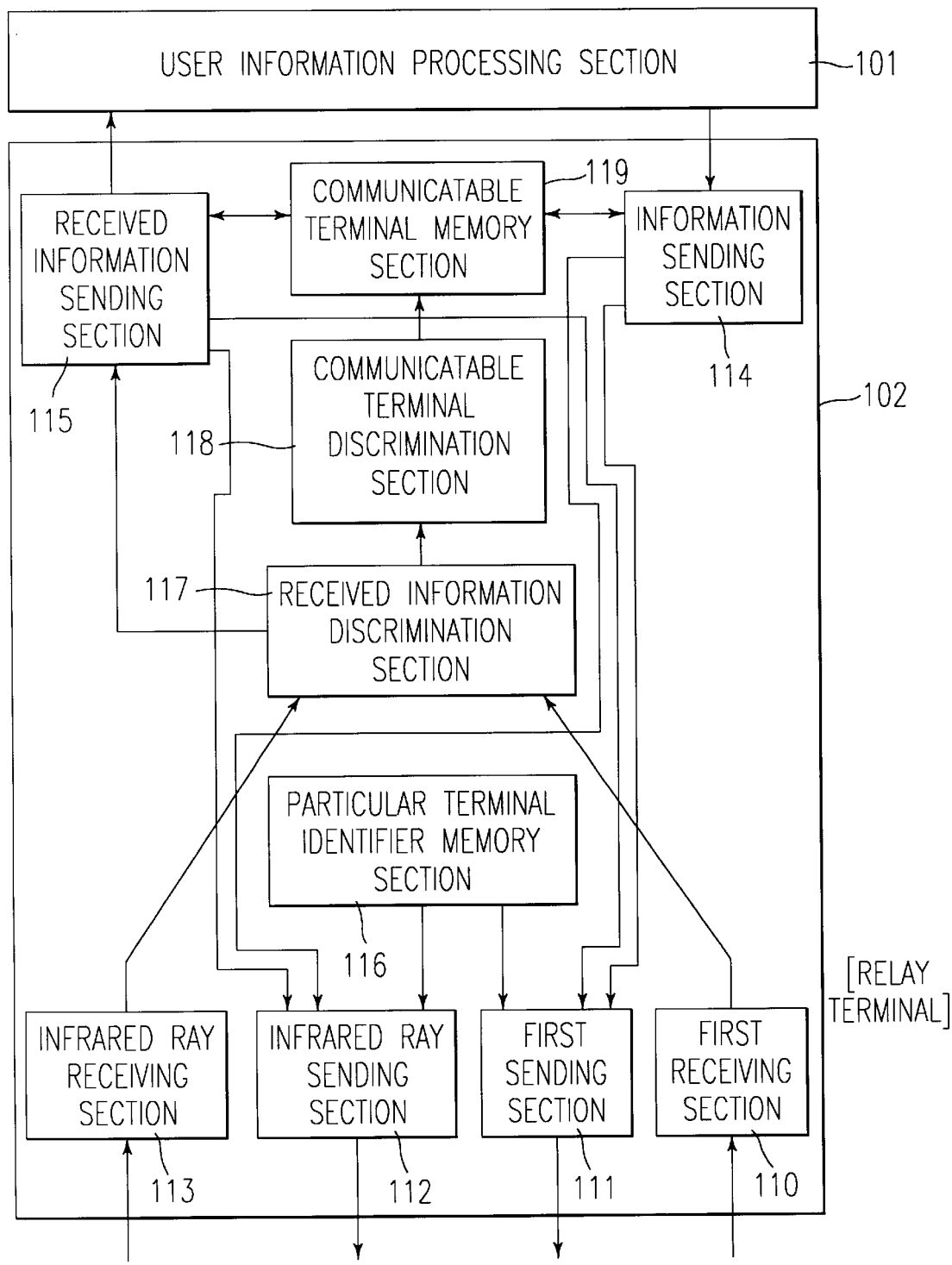
FIG. 6 is a block diagram of the relay terminal according to a second embodiment of the present invention.
Figure 7:
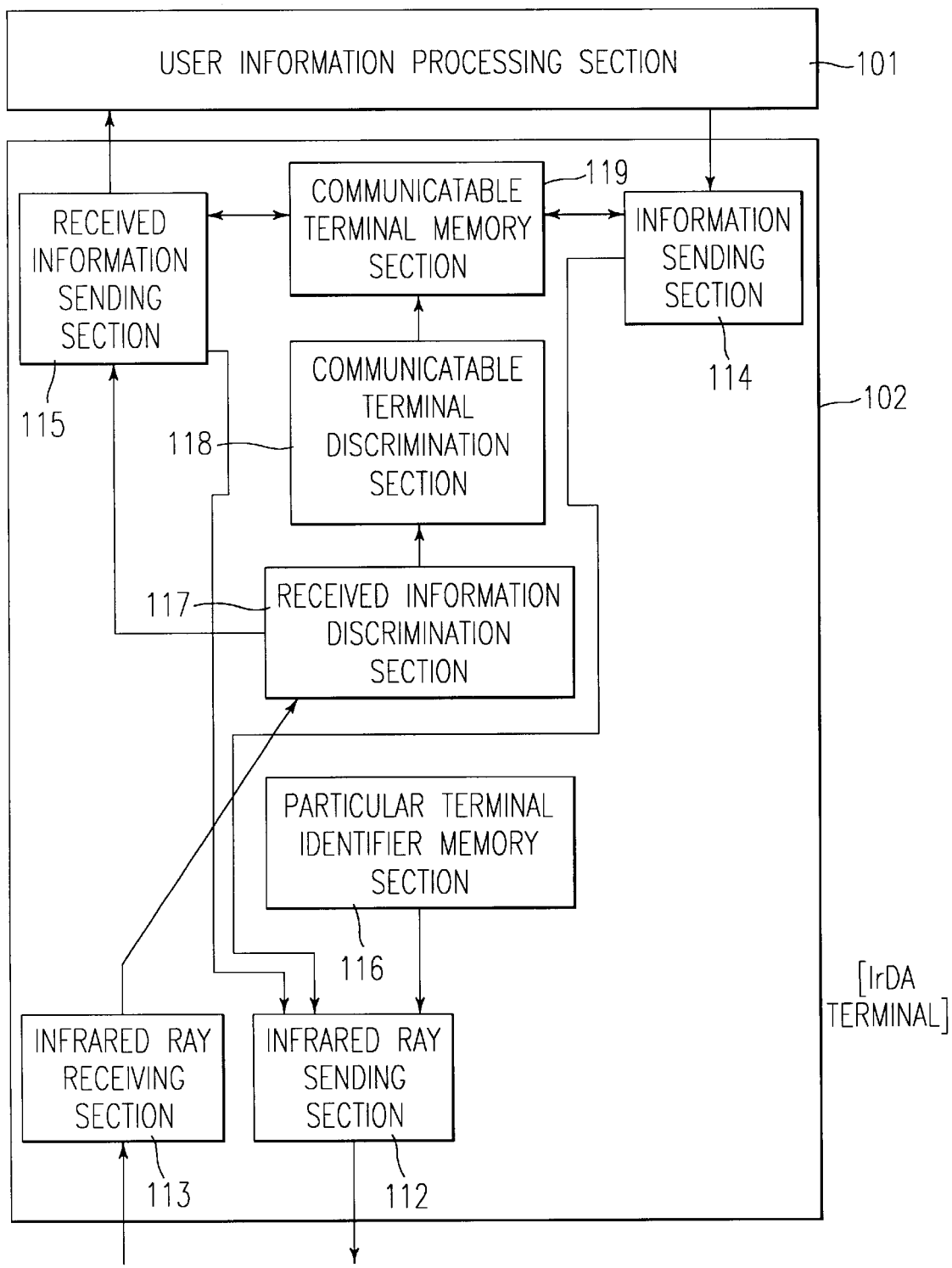
FIG. 7 is a block diagram of the IrDA terminal according to the second embodiment of the present invention.
Figure 8:
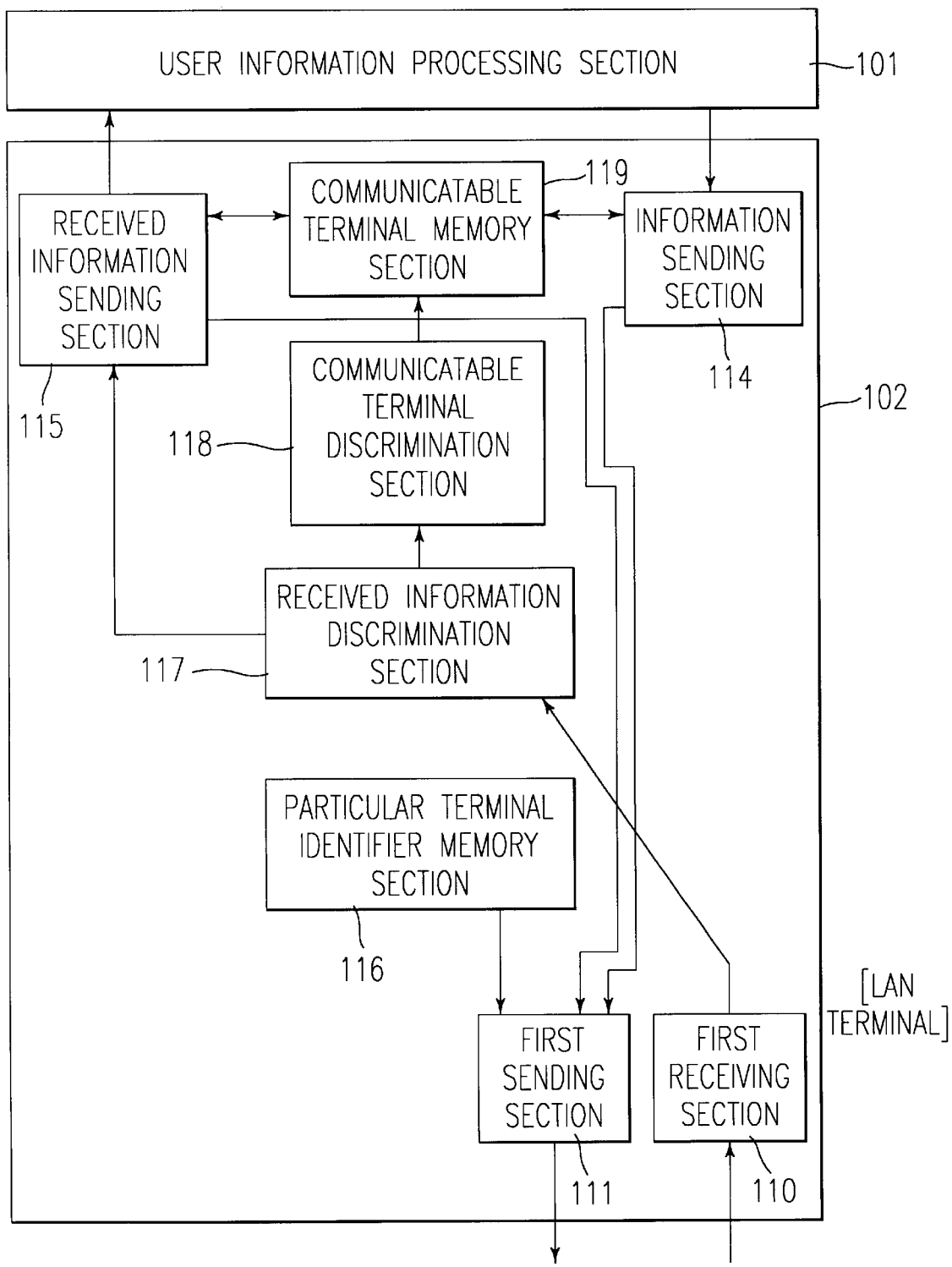
FIG. 8 is a block diagram of the LAN terminal according to the second embodiment of the present invention.

FIG. 6 is a block diagram of the relay terminal of the second embodiment; FIG. 7 is a block diagram of an IrDA terminal of the second embodiment; FIG. 8 is a block diagram of a LAN terminal of the second embodiment. Each terminal includes the user information processing section 101 and the communication control section 102. In the relay terminal shown in FIG. 6, the communication control section 102 additionally includes a particular terminal identifier memory section 116, a received information discrimination section 117, a communicatable terminal discrimination section 118, and a communicatable terminal memory section 119 in comparison with FIG. 2.

The particular terminal identifier memory section 116 stores an identifier of its own terminal (relay terminal ID in FIG. 6). This identifier is supplied to the first sending section 111 and the infrared ray sending section 112 as terminal discrimination information in case of sending. The received information discrimination section 117 receives the information from the first receiving section 110 or the infrared ray receiving section 113. If the received information is the terminal discrimination information, an identifier in the terminal discrimination information and an attribute indicating the kind of the receiving section are supplied to the communicatable terminal discrimination section 118. If the received information is not the terminal discrimination information, the received information and the attribute are supplied to the received information sending section 115. The communicatable terminal discrimination section 118 discriminates the terminal ID and creates a table for storing the terminal ID and the attribute of the kind of the receiving section as shown in FIG. 9. The attribute represents the kind of network (LAN or IrDA) to which the terminal of ID is connected. This table is supplied to the communicatable terminal memory section 119. In FIG. 6, the first receiving section 110, the first sending section 111, the infrared ray sending section 112, the infrared ray receiving section 113, the information sending section 114, the received information sending section 115 are the same as those sections in FIG. 2. The received information sending section 115 receives the information from the infrared ray receiving section 113 and the first receiving section 110 through the received information discrimination section 117, and processes the information received from a communicatable terminal and the sending information to the communicatable terminal by referring to the communicatable terminal memory section 119. The information sending section 114 supplies the sending information to the first sending section 111 or the infrared ray sending section 112. In short, when the sending information is inputted by the user information processing section 101, the information is supplied to either or both the first sending section 111 and the infrared ray sending section 112 by referring to the communicatable terminal memory section 119. For example, if the user information processing section 101 requests to send the information with the terminal ID as a destination address, the information sending section 114 retrieves the attribute corresponding to the terminal ID from the table in FIG. 9 and supplies the information to the first sending section 111 or the infrared ray sending section 112 corresponding to the attribute.

The first sending section 111 is a communication means to realize a serial communication function through a transmission path, and sends the information supplied from the information sending section 114 or the received information sending section 115. The infrared ray sending section 112 includes an infrared ray optical resource and sends the information as an infrared ray signal by driving the optical resource. The infrared ray receiving section 113 includes a light receiving element for photoelectric conversion, and outputs the electric signal converted from the infrared ray signal. The first receiving section 110 includes the serial communication function, and receives the signal transmitted from LAN network. The first receiving section 110 and the infrared ray receiving section 113 supplies the received information to the received information sending section 115.

If a destination address of the received information represents its own terminal (the particular terminal) ID, the received information sending section 115 supplies the information to the user information processing section 101, and sends the information to at least one of the first sending sections 111 and the infrared ray sending sections 112 according to the table in the communicatable terminal memory section 119. If the destination address does not to represent its own terminal ID, the received information sending section 115 sends the information to at least one of the first sending sections 111 and the infrared ray sending sections 112 according to the table in the communicatable terminal memory section 119. The user information processing section 101 executes an application program. The IrDA terminal in FIG. 7 has a construction in which LAN function elements are excluded from FIG. 6 and the LAN terminal in FIG. 8 has a construction in which IrDA function elements are excluded from FIG. 6.

Next, operation of this system is explained. As shown in FIG. 9, the terminal ID and the attribute representing the kind of the receiving section to communicate to the terminal are stored as a table in the communicatable terminal memory section 119. In case the relay terminal sends information according to the request or the information received from the receiving section, the sending section (111 or 112) is selected according to the table.

[Creation of the Table in the Communicatable Terminal Memory Section 119]

In this system, the first receiving section 110 and the infrared ray receiving section 113 previously store each attribute information. The attribute is, for example, LAN or IrDA. In case of activation of the system, at the initial-connection of the terminal or periodically, each terminal sends its own terminal ID as the terminal discrimination information through the network (LAN or IrDA). When the relay terminal receives the terminal discrimination information, the relay terminal recognizes the terminal ID and the attribute representing the kind of the receiving section, and registers these data in the table shown in FIG. 9. In the relay terminal, when the received information is transmitted to other terminal or the input information is sent to other terminal according to the request, the sending section (111 or 112) to send the information is selected by referring to this table. Therefore, each terminal including the relay terminal Cs prepares the following construction. First, the LAN terminals C1~C3 and the relay terminal Cs includes the first sending section 111. The first sending section 111 sends its own terminal ID stored in the particular terminal identifier memory section 116, and the information supplied from the information sending section 114 and the received information sending section 115. Second, the IrDA terminal and the relay terminal each include the infrared ray sending section 112. The infrared ray sending section 112 sends its own terminal ID stored in the particular terminal identifier memory section 116, and the information supplied from the information sending section 114 and the received information sending section 115. Especially, in case of activation of the system, at the initial-connection of the terminal or periodically, each terminal sends its own terminal ID (particular terminal ID) as the terminal discrimination information. In this case, the terminal ID may be previously registered to the terminal by the user, or may be dynamically assigned by referring to the communicatable terminal memory section 119. The relay terminal Cs receives the terminal ID through the first receiving section 110 or the infrared ray receiving section 113.

As mentioned-above, the first receiving section 110 and the infrared ray receiving section 113 previously store the attribute information (LAN or IrDA) representing the kind of each receiving section. When the first receiving section 110 or the infrared ray receiving section 113 receives the information, this received information and its own attribute information are supplied to the received information discrimination section 117. In short, when the first receiving section 110 receives the information through a LAN, the first receiving section 110 supplies the received information and its own attribute (LAN) to the received information discrimination section 117. When the infrared ray receiving section 113 receives the information through an IrDA network, the infrared ray receiving section 113 supplies the received information and its own attribute (IrDA) to the received information discrimination section 117. The received information discrimination section 117 supplies the terminal ID and the attribute to the communicatable terminal discrimination section 118, and supplies other received information to the received information sending section 115. The communicatable terminal discrimination section 118 creates a table consisting of the terminal ID and the attribute as shown in FIG. 9 and registers the table in the communicatable terminal memory section 119.

In this way, during the activation of system, at the initial-connection of the terminal or periodically, each terminal sends its own terminal ID as the terminal discrimination information. When the relay terminal receives this terminal discrimination information, the terminal ID and the attribute of the receiving section are supplied to the received information discrimination section 117. The received information discrimination section 117 extracts the terminal ID and the attribute from the received information and supplies them to the communicatable terminal discrimination section 118. The communicatable terminal discrimination section 118 creates a table consisting of the terminal ID and the attribute and registers the table in the communicatable terminal memory section 119. In this system, when sending or transferring the information, the sending section (111, 112) is selected by referring to this table. Next, activation of sending the information in response to a sending request is explained.

[Sending Information in Response to the Sending Request]

In the relay terminal Cs, assume that the sending request and the terminal ID as the destination address are supplied from the user information processing section 101 to the information sending section 114. In this case, the sending information and the terminal ID with the request are supplied as a predetermined format. The information sending section 114 recognizes the destination terminal ID from the information and compares the destination terminal ID with the terminal ID stored in the communicatable terminal memory section 119. In short, the content of the destination information is extracted from the supplied information and the destination terminal ID is recognized from the content. Then, the attribute corresponding to the terminal ID matched with the destination terminal ID is extracted. In case of the attribute "LAN", the sending information is supplied to the first sending section 111. In case of the attribute "IrDA", the sending information is supplied to the infrared ray sending section 112. For example, assume that LAN terminal ID "C1, C2" and IrDA terminal ID "Cc" are indicated as the destination address through the user information processing section 101. In response to this request, the information sending section 114 recognizes as the destination terminal ID "C1, C2, Cc" from the destination information, and examines the kind of the receiving section of the terminals C1, C2, C3 by referring to the table in the communicatable terminal memory section 119. The sending information is supplied to the sending section (111 or 112) corresponding to the attribute. In case the destination terminal ID is the LAN terminals C1, C2, the sending information is supplied to the first sending section 111. In case the destination terminal ID is the IrDA terminal Cc, the sending information is supplied to the infrared ray sending section 112. In short, terminals C1, C2 are connected to LAN network and terminal Cc is connected to IrDA network. As for the terminals C1, C2, the attribute is "LAN" and the communication is executed by the first sending section 111 and the first receiving section 110. As for the terminal Cc, the attribute is "IrDA" and the communication is executed by the infrared ray sending section 112 and the infrared ray receiving section 113. In this example, the sending information is supplied both by the first sending section 111 and the infrared ray sending section 112. The first sending section 111 and the infrared ray sending section 112 transmits the sending information through the respective network. In this place, if the destination terminal ID is "Cs", this terminal ID is not stored in the table of FIG. 9. Therefore, the information sending section controls to stop sending the information, or may supply the sending information to the first sending section 111.

In this way, in response to the sending request, the relay terminal Cs examines the attribute of the destination terminal ID by referring to the table, selects the sending section according to the attribute, and supplies the sending information to the selected sending section.

[Activation of Receiving Information]

Assume that the first receiving section 110 of the relay terminal Cs receives an information from LAN network. The first receiving section 110 supplies the information to the received information discrimination section 117. In case of terminal discrimination information, the received information discrimination section 117 supplies this information to the communicatable terminal discrimination section 118 and the received information sending section 115. In case of other information, the received information discrimination section 117 supplies this information to the received information sending section 115. The received information sending section 115 decides whether a destination address of the received information includes the relay terminal Cs (its own terminal). In case of the relay terminal Cs, the received information is supplied to the user information processing section 101. In case the destination address includes IrDA terminal Cc, the received information is also supplied to the infrared ray sending section 112. The infrared ray sending section 112 sends the received information to IrDA terminal Cc through IrDA network. If the infrared ray receiving section 113 of the relay terminal Cs receives an information from IrDA terminal Cc, the received information description section 117 supplies this information to the received information sending section 115 and the communicatable terminal discrimination section 118 in case of the terminal discrimination information. In case of other information, this received information is supplied to the received information sending section 115. The received information sending section 115 decides whether a destination address of the received information includes the relay terminal Cs (its own terminal). In case of the relay terminal Cs, the received information is supplied to the user information processing section 101. In case the destination address includes a LAN terminal ID stored in the communicatable terminal memory section 119, the received information is also supplied to the first sending section 111. The first sending section 111 sends the received information to the LAN terminal through the LAN network.

In the above explanation, if the destination address includes at least one LAN terminal ID except for the relay terminal Cs stored in the communicatable terminal memory section 119, this received information is supplied to the first sending section 111. However, if the destination address includes all LAN terminal IDs with the relay terminal Cs, the received information may be supplied to the first sending section 111. Because this received information is supplied to the user information processing section 101 of the relay terminal Cs. The user information processing section 101 processes the received information by application. As an application processing, the received information is transferred to the LAN terminals. In this case, the user information processing section 101 outputs a transfer request to the information sending section 114. Accordingly, the received information sending section 115 does not control a transfer of the received information.

Another example is explained. Assume that the first receiving section 110 of the relay terminal Cs receives an information whose destination address is Cs, Cc. In case of terminal discrimination information, the received information discrimination section 117 supplies the received information to the communicatable terminal discrimination section 118 and the received information sending section 115. In case of other information, the received information is supplied to the received information sending section 115 only. The received information sending section 115 examines which communication means is prepared in the terminal of the destination address by referring to the table in FIG. 9.

As a result, the table stores the terminal Cc with IrDA attribute. Therefore, the received information sending, section 115 of the relay terminal Cs supplies the received information to the infrared ray sending section 112 and the user information processing section 101. The infrared ray sending section 112 sends the received information as an infrared ray signal. The user information processing section 101 processes the received information by application. In this way, if the relay terminal Cs receives the information whose destination address is Cs, Cc, the received information is transferred to the terminal Cc by the infrared ray sending section 113.

Next, assume that the infrared ray receiving section 113 of the relay terminal Cs receives information whose destination address is Cs, C1, C3. In the case of terminal discrimination information, the received information discrimination section 117 supplies the received information to the communicatable terminal discrimination section 118 and the received information sending section 115. In the case of other information, the received information is supplied to the received information sending section 115 only. The received information sending section 115 examines which communication means is prepared in the terminal of the destination address by referring to the table in FIG. 9. As a result, the table stores the terminals C1, C3 with a LAN attribute. Therefore, the received information sending section 115 of the relay terminal Cs supplies the received information to the first sending section 111 and the user information processing section 101. The first sending section 111 sends the received information through the LAN network. The user information processing section 101 processes the received information by application.

In this case, the received information sending section 115 may directly supply the received information to the first sending section 111 or may not supply the received information to the first sending section 111. Because the destination address of the received information includes the relay terminal Cs and the received information is supplied to the user information processing section 101. The user information processing section 101 processes the received information by application. As an application processing, the received information is transferred to the LAN terminal. In this case, the user information processing section 101 outputs a transfer request to the information sending section 114. Accordingly, the received information sending section 115 does not control a transfer of the received information.

If the relay terminal Cs receives information whose destination address is the relay terminal Cs only, the received information sending section 115 does not supply this information to the first sending section 111 and the infrared ray sending section 112.

In case of a moving terminal, this terminal is often excluded from the network by moving to another place. In order to cope with this case, each terminal in the network periodically outputs its respective terminal ID. The relay terminal Cs as the receiving side stores the terminal ID with the receiving time in the communicatable terminal memory section 119. Then, if the relay terminal Cs does not receive the terminal ID for a predetermined period from the receiving time, the relay terminal Cs determines that the terminal corresponding to the ID moved away from the network. In this case, information of this terminal ID and the receiving time is deleted in the communicatable terminal memory section 119. Then, a communication completion message representing the non-existance of the terminal is broadcast to other terminals in the network. In this way, registration of the terminal that moved away from the network is deleted and confusion in the network is avoided.

As mentioned-above, in the second embodiment, the relay terminal Cs manages communication resources useful for LAN terminals and an IrDA terminal, and decides the destination address from the received information. If the IrDA terminal is irrelevant as the destination address, the received information is not transferred to the IrDA terminal. If the LAN terminal is irrelevant as the destination address, the received information is not transferred to the LAN terminal. Accordingly, each terminal in the network (LAN, IrDA) does not receive unnecessary packets and the communication resource is effectively used in the network.

(The Third Embodiment)

The terminal Cc can use the IrDA communication function only to communicate with another terminal. Therefore, the IrDA terminal Cc cannot communicate with a LAN terminal as it is. In the second embodiment, by connecting the IrDA terminal Cc to the relay terminal Cs, the IrDA terminal Cc can communicate with the LAN terminal. However, in this case, if the terminal ID of the IrDA terminal Cc is not recognized by LAN terminals, the IrDA terminal Cc can not receive the information from LAN side. Therefore, in the third embodiment, a procedure of registering the IrDA terminal ID is effectively executed without the load of the IrDA terminal. In this place, the relay terminal Cs sends as a substitute the terminal ID of IrDA terminal Cc to LAN terminals C1~C3. Even if the IrDA terminal Cc does not send its own ID, the LAN terminals C1~C3 can recognize the existence of the IrDA terminal Cc. Therefore, the sending quantity of the IrDA terminal Cc decreases, and the communication quantity of the IrDA network, whose communication speed is low in comparison with LAN network, greatly decreases.

In the third embodiment, in the same way as in the second embodiment, when the relay terminal Cs receives the terminal discrimination information, the communicatable terminal discrimination section 118 of the relay terminal Cs recognizes the terminal ID from the received information and creates a table consisting of the terminal ID and the attribute as shown in FIG. 9. This table is registered in the communicatable terminal memory section 119. A method to substitutely send the terminal ID according to the table is explained. As mentioned-above, the IrDA terminal Cc can communicate with the LAN terminal by connecting to the relay terminal Cs. First, in case of initial-connection to the system, IrDA terminal Cc sends the terminal ID (the terminal discrimination information) to the relay terminal Cs. The relay terminal Cs receives this information by the infrared ray receiving section 113. The infrared ray receiving section 113 supplies the received information with the attribute of the receiving section (IrDA) to the received information discrimination section 117. The received information discrimination section 117 extracts the terminal ID from the received information and supplies the terminal ID with the attribute to the communicatable terminal discrimination section 118. The communicatable terminal discrimination section 118 creates a table consisting of the terminal ID and the attribute, and registers this table in the communicatable terminal memory section 119. After registration, the information sending section 114 outputs a sending request of confirmation information (ID of the relay terminal Cs, or IDs of the relay terminal Cs and the IrDA terminal Cc) to the infrared ray sending section 112. The infrared ray sending section 112 sends this confirmation information by an infrared ray signal. In this way, IrDA terminal Cc in which a connection request occurs sends its own terminal ID to the relay terminal Cs. After receiving the terminal ID, the relay terminal Cs registers the terminal ID of IrDA terminal Cc to the table. After registration, the relay terminal Cs replies the confirmation information to the IrDA terminal Cc. Therefore, the IrDA terminal Cc confirms that the terminal ID is registered in the relay terminal Cs. Then, the IrDA terminal Cc stops sending of the terminal ID. In the relay terminal Cs, the terminal ID of the IrDA terminal Cc is sent by the first sending section 111. In short, in the relay terminal Cs, if the communicatable terminal memory section 119 stores the terminal ID whose attribute is IrDA, this terminal ID (Cc in FIG. 9) is sent by the first sending section 111. In each LAN terminal, when the first receiving section 110 receives the terminal ID (Cc) sent as a substitute from the relay terminal Cs, this terminal ID and the attribute of the receiving section (LAN in FIG. 5) are supplied as the received information to the received information discrimination section 117. The received information discrimination section 117 extracts the terminal ID and the attribute from the received information, and supplies the terminal ID and the attribute to the communicatable terminal discrimination section 118. The communicatable terminal discrimination section 118 creates a table consisting of the terminal ID and the attribute as shown in FIG. 10, and registers this table in the communicatable terminal memory section 119. After registration, the information sending section 114 of each LAN terminal outputs a sending request of confirmation information (ID of the IrDA terminal Cc, or IDs of the IrDA terminal Cc and the LAN terminal) to the first sending section 111. The first sending section 111 sends this confirmation information through the LAN. When the relay terminal Cs receives the confirmation information, the relay terminal Cs confirms that the IrDA terminal ID (Cc) is registered in the LAN terminals (C1~C3). In this case, the relay terminal Cs may send this confirmation to the IrDA terminal Cc. Accordingly, the IrDA terminal Cc confirms that its own terminal ID (Cc) is registered in the LAN terminals (C1~C3).

As mentioned-above, in the third embodiment, the relay terminal Cs sends the identifier of the terminal Cc to LAN terminals. Therefore, even if IrDA terminal Cc does not send the identifier to each LAN terminal, LAN terminals C1~C3 can recognize existence of terminal Cc. As a result, the sending quantity of the IrDA terminal Cc and communication quantity on the IrDA network are greatly decreased.
(The Fourth Embodiment)

In the third embodiment, when the communicatable terminal discrimination section 118 receives the terminal discrimination information, the terminal ID is recognized from this information, and the table shown in FIG. 9 is newly registered in the communicatable terminal memory section 119. In the fourth embodiment, when the relay terminal Cs sends its own identifier (Cs), the relay terminal Cs sends as a substitute the identifier of IrDA terminal Cc by taking advantage of occasion. In short, the first sending section 111 and the infrared ray sending section 112 of the relay terminal Cs substitutely sends the identifier (Cc) with its own identifier (Cs).

In the relay terminal Cs of the fourth embodiment, the first sending section 111 and the infrared ray sending section 112 prepares the following function. In case of generation of a sending request or periodically, the first sending section 111 and the infrared ray sending section 112 sends the identifier (Cs). In this case, if an identifier of IrDA terminal Cc is already registered in the communicatable terminal memory section 119, this terminal identifier (Cc) is read out and sent with the identifier (Cs) by the first sending section 111. If identifiers of LAN terminals C1~C3 are already registered in the communicatable terminal memory section 119, these terminal identifiers (C1~C3) are read out and sent with the identifier (Cs) by the infrared ray sending section 112. In short, the infrared ray sending section 112 sends the identifier (Cs) with LAN terminal identifiers (C1~C3) and the first sending section 111 sends the identifier (Cs) with IrDA terminal identifier Cc.

In the fourth embodiment, in case of receiving a sending request from the information sending section 114 or the received information sending section 115, or periodically, the first sending section 111 and the infrared ray sending section 112 sends the requested information with the identifier (Cs) stored in the particular terminal identifier memory section 116. In case of sending the identifier (Cs), the first sending section 111 additionally sends the identifier (Cc) of the IrDA terminal. In short, a substitute sending of the identifier (Cc) of the IrDA terminal is executed. In the same way, in case of sending the identifier (Cs), the infrared ray sending section 112 additionally sends the identifiers (C1~C3) of the LAN terminals. In short, a substitute sending of the identifiers (C1~C3) of the LAN terminals is executed.

Data activation is now explained. When the IrDA terminal Cc sends its own identifier (Cc) as the infrared ray signal to the relay terminal Cs, the relay terminal Cs receives this identifier by the infrared ray receiving section 113. The infrared ray receiving section 113 supplies the identifier and the attribute of receiving section (IrDA) as the received information to the received information discrimination section 117. The received information discrimination section 117 extracts the identifier (Cc) and the attribute from the received information, and supplies the identifier and the attribute to the communicatable terminal discrimination section 118. The communicatable terminal discrimination section 118 creates a table consisting of the identifier and the attribute, and registers this table in the communicatable terminal memory section 119. After registration, the information sending section 114 outputs a sending request of confirmation information (the identifier (Cs), or the identifiers (Cs, Cc)) to the infrared ray sending section 112. The infrared ray sending section 112 sends the confirmation information as the infrared ray signal. Accordingly, the IrDA terminal Cc confirms that its own identifier (Cc) is registered in the relay terminal Cs. In the relay terminal Cs, the registration status of IrDA terminal is examined by referring to the table in the communicatable terminal memory section 119. In the fourth embodiment, substitute sending by referring to this table is executed as follows. In case the first sending section 111 sends the identifier (Cs), the registration terminal ID, except for its own (ID), is examined by referring to the table. In short, the table is checked regarding whether terminal ID, whose attribute is IrDA, is already registered. If the IrDA terminal is registered, this terminal ID is read out from the table. Concretely speaking, when the first sending section 111 sends the identifier (Cs), the received information sending section 115 decides whether IrDA terminal ID (the attribute is IrDA) is already registered in the table. In FIG. 9, the terminal identifier (Cc) is only extracted from the table. However, if other IrDA terminal identifiers are registered in the table, all of these IrDA terminal identifiers are extracted from the table. In this way, in case of sending the identifier (Cs), the IrDA terminal ID is attached to the identifier (Cs) to be additionally sent. When the infrared ray sending section 112 sends the identifier (Cs), the table is checked regarding whether the LAN terminal identifiers (the attribute is LAN) are already registered. If one or a plurality of LAN terminal identifiers are extracted from the table, the LAN terminal identifiers are regarded as one terminal discrimination information and simply sent by the infrared ray sending section 112. If the IrDA terminal identifier is not registered in the table, the relay terminal Cs sends its own identifier (Cs) only. In short, substitute sending is not executed.

As mentioned-above, in the fourth embodiment, the IrDA terminal Cc, whose IrDA communication speed is low, does not send its own identifier to LAN terminals except for the relay terminal Cs. Furthermore, the IrDA terminal Cc can receive a plurality of the identifiers of LAN terminals as one terminal discrimination information from the relay terminal. Accordingly, the amount of information received by the IrDA terminal Cc is greatly reduced and the quantity of packets between networks (IrDA and LAN) also is greatly reduced.

(The Fifth Embodiment)

Figure 11:
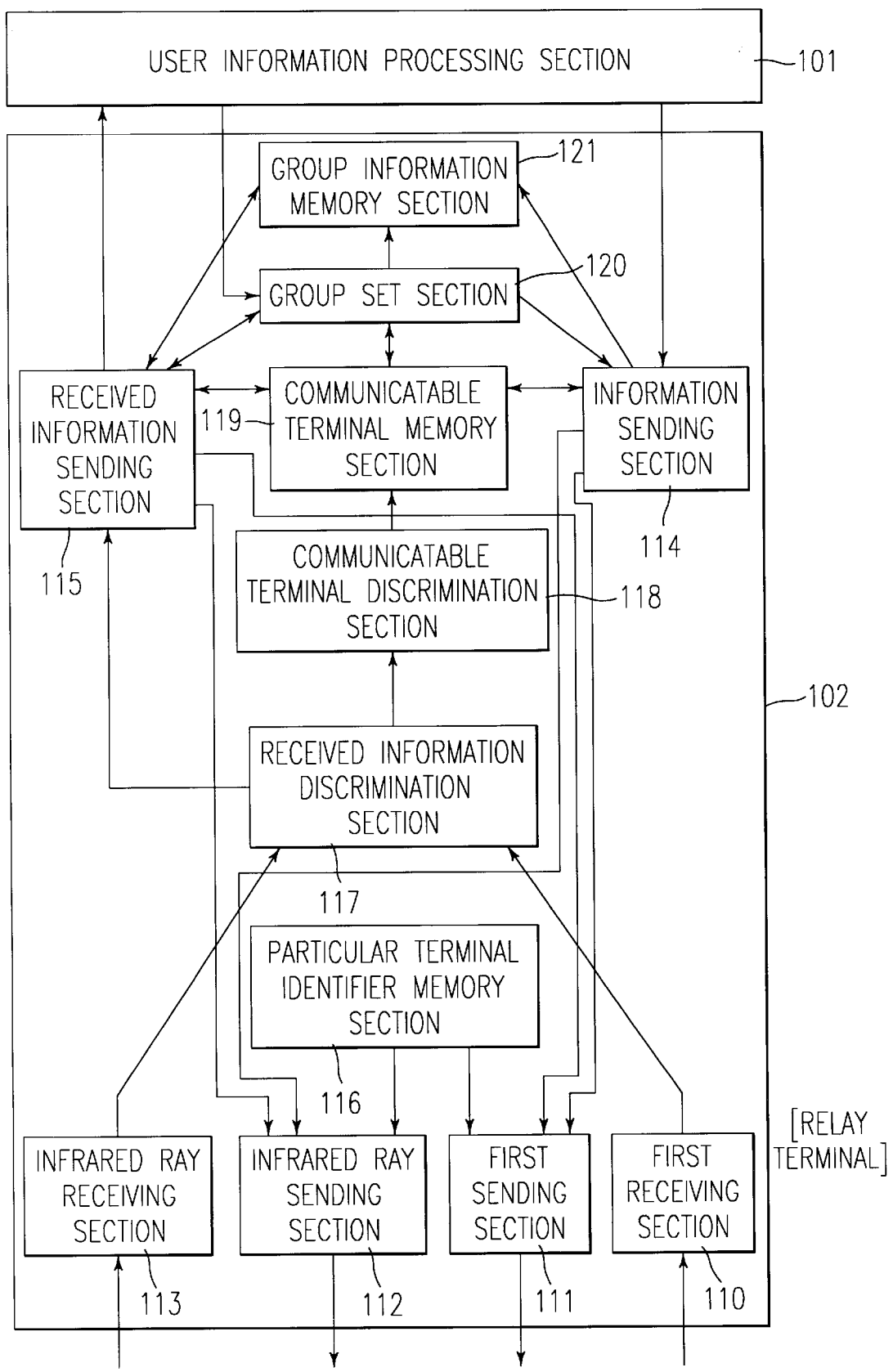
FIG. 11 is a block diagram of the relay terminal according to a fifth embodiment of the present invention.
Figure 12:
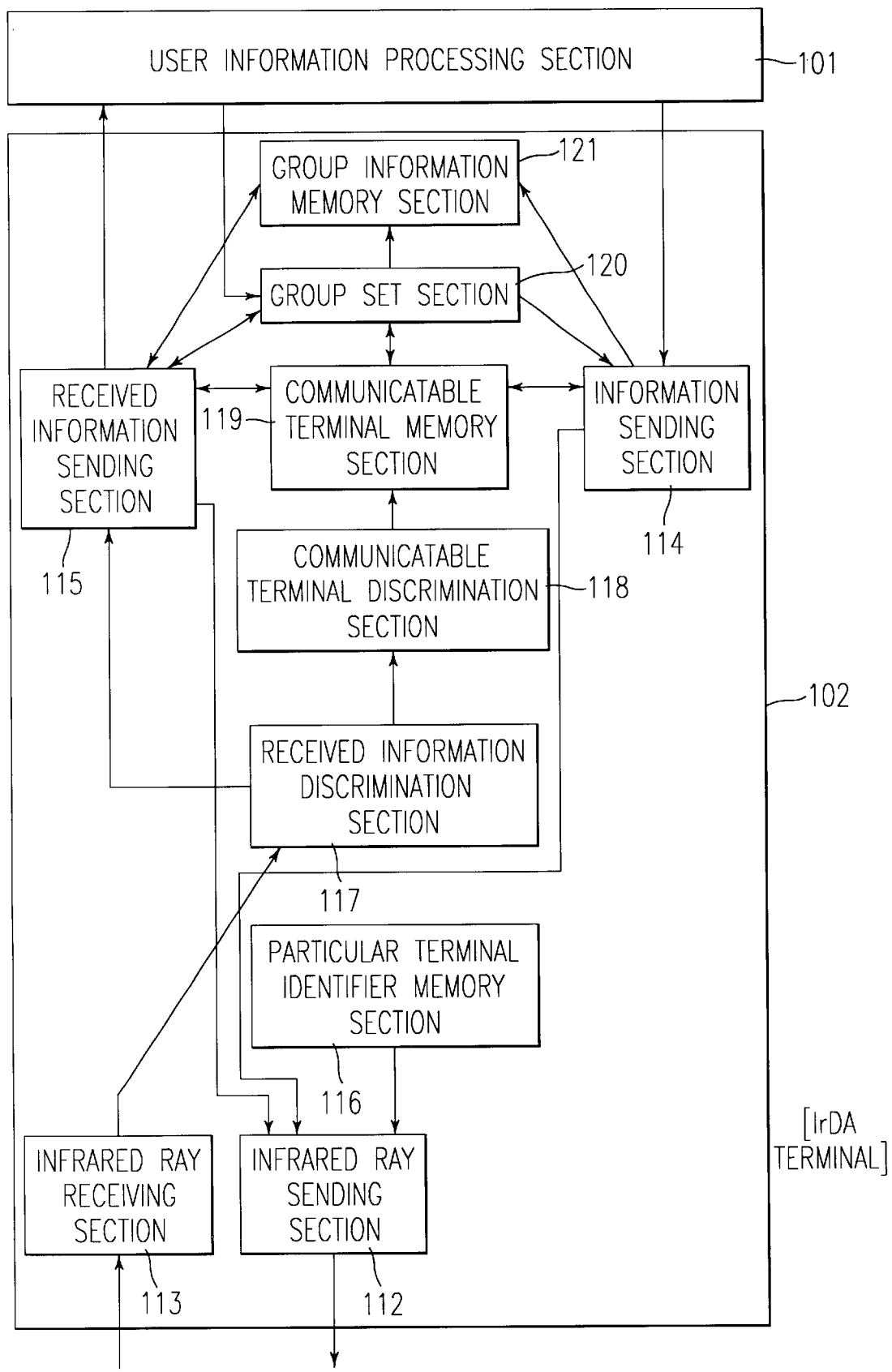
FIG. 12 is a block diagram of the IrDA terminal according to the fifth embodiment of the present invention.
Figure 13:
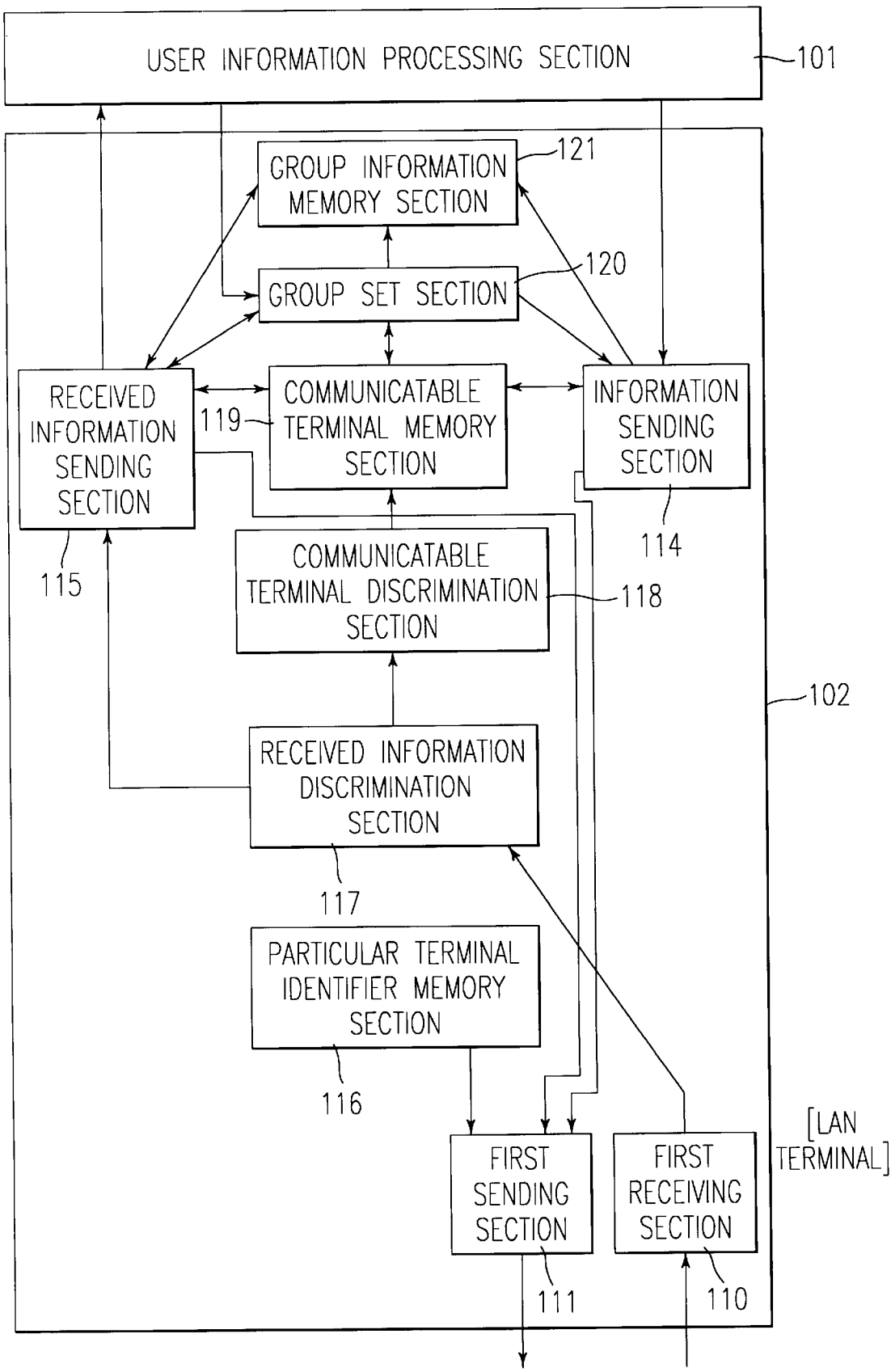
FIG. 13 is a block diagram of the LAN terminal according to the fifth embodiment of the present invention.

In the fifth embodiment, as for the IrDA terminal which prepares one-to-one communication function, multicast communication is realized. FIG. 11 is a block diagram of the relay terminal of the fifth embodiment, FIG. 12 is a block diagram of IrDA terminal of the fifth embodiment, FIG. 13 is a block diagram of LAN terminal of the fifth embodiment. New sections shown in FIGS. 11~13 in comparison with FIGS. 6~8, are a group set section 120 and a group information memory section 121. In the IrDA terminal of FIG. 12, LAN communication elements are excluded from the block diagram of FIG. 11. In the LAN terminal of FIG. 13, the infrared ray communication elements are excluded from the block diagram of FIG. 11. Each terminal in FIGS. 11~13 is comprised of the user information processing section 101 and the communication control section 102. The group set section 120 and the group information memory section 121 are included in the communication control section 102. In the same way as in the second embodiment, the communicatable terminal memory section 119 stores the communicatable terminal ID and the attribute of kind of receiving section as a table. The group set section 120 includes a group creation function for grouping a plurality of terminals indicated by the user, a group participation function for participating in the group, a group escape function for escaping from the group, a group completion function for completing the group. The received information sending section 115, the information sending section 114, the user information processing section 101 includes the following function.

[Processing of Creating a Group]

In the situation of FIG. 5, assume that a user of the relay terminal Cs requests a creation of a group consisting of an IrDA terminal Cc and LAN terminals C1, C3. The group set section 120 of the relay terminal Cs sends a group creation request from the first sending section 111 and the infrared ray sending section 112 through the information sending section 114. The group creation request is received by the terminals Cc, C1, C3. In IrDA terminal Cc, the infrared ray receiving section 113 receives this request signal. In LAN terminals C1, C3, the first receiving section 110 receives this request signal. In each terminal, the request signal is supplied to the received information sending section 115 through the received information discrimination section 117. The received information sending section 115 recognizes this request signal as creation of the group consisting of terminals Cc, C1, C3, and supplies this request information to the group set section 120. In terminals Cc, C1, C3, the group set section 120 creates a group creation permission information to participate in the group or a group creation rejection information not to participate in the group, and stores the reply information in the group information memory section 121. After storing the reply information, the information sending section 114 reads the reply information from the group information memory section 121. In case of IrDA terminal Cc, the reply information is sent by the infrared ray sending section 112. In case of LAN terminals C1, C3, the reply information is sent by the first sending section 111. In this case, each terminal identifier (Cc, C1, C3) is additionally sent with the response information.

In the relay terminal Cs, the reply information is received by the first receiving section 110 and the infrared ray receiving section 113. This reply information is supplied to the received information sending section 115 through the received information discrimination section 117. The received information sending section 115 recognizes the reply information as the group creation permission/rejection information and supplies the group creation permission/rejection information to the group set section 120. When the group set section 120 receives the group creation permission/rejection information of terminals Cc, C1, C3, the group set section 120 stores the identifier of each terminal that replied to the group creation permission information in the group information memory section 121 as a group member. The group set section 120 sets a group identifier for the group consisting of the terminal identifiers in the group information memory section 121. Then, the information sending section 114 reads the group identifier and the terminal identifiers of participation terminal from the group information memory section 121, and supplies the group identifier and the terminal identifiers as a group creation result information to the first sending section 111 and the infrared ray sending section 112. The first sending section 111 and the infrared ray sending section 112 sends the group creation result information to the participating terminals or all communicatable terminals. When each of the participating terminals or all communicatable terminals receive the group creation result information, this information is supplied to the group set section 120 through the received information sending section 115. The group set section 120 recognizes the group creation result information as creation of a new group, and registers this new group information in the group information memory section 121.

Figure 14:
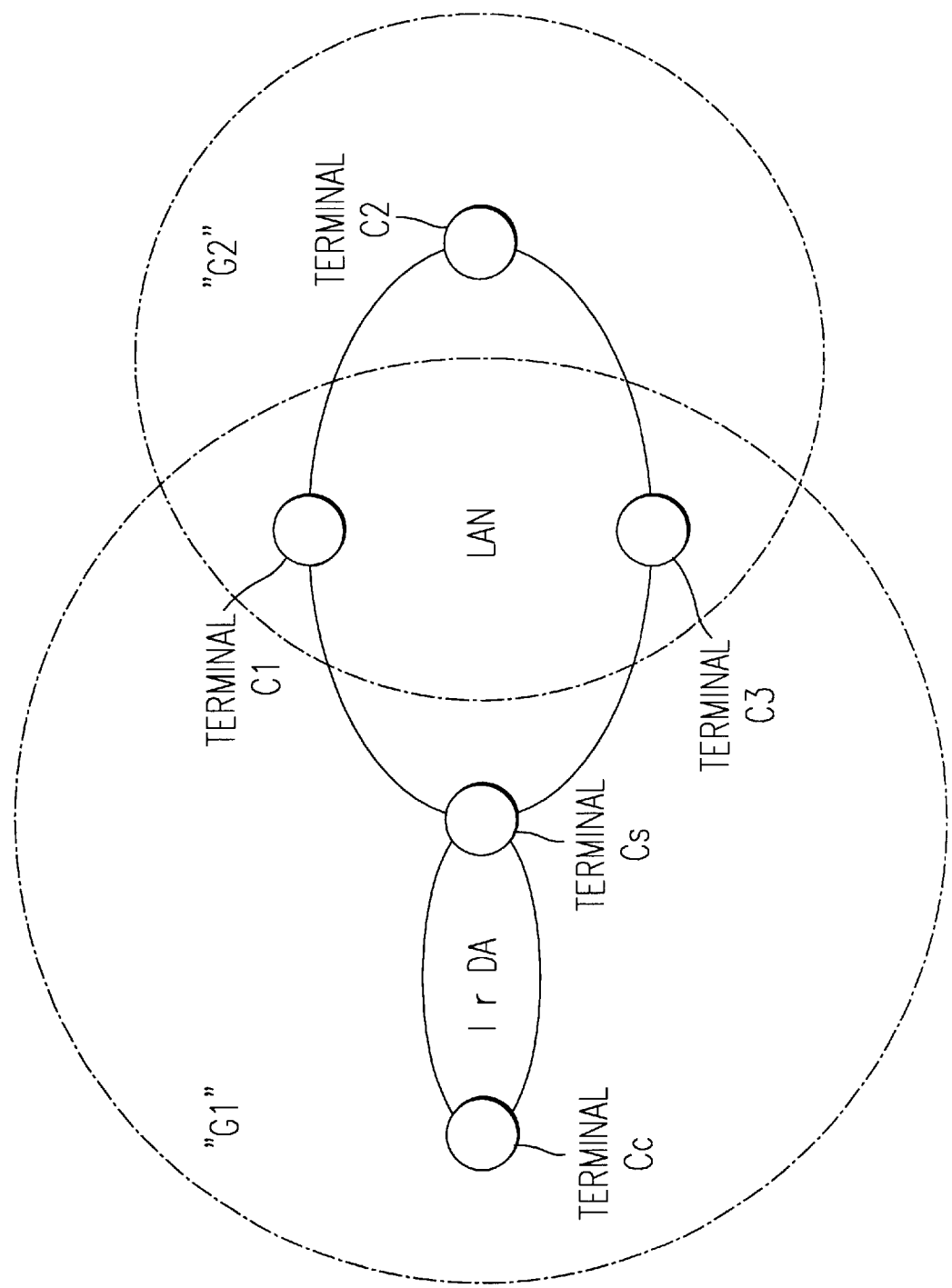
FIG. 14 is a schematic diagram illustrating a created group according to the fifth embodiment of the present invention.

For example, if each terminal Cc, C1, C3 transmits in reply the group creation permission information, the relay terminal Cs sets a group identifier "G1" to the group consisted of terminals Cs, Cc, C1, C3, and multicastly sends the group creation result information to each group member terminal. Accordingly, each group member terminal can recognize creation of a new group. By broadcasting the group creation result information, a terminal C2 as non-group member also recognizes the creation of a new group. FIG. 14 shows an example of group creation and FIG. 15 shows a group information management table in the group information memory section 121 of each terminal. As shown in FIG. 14, a group of the group identifier "G1" consists of the IrDA terminal Cs, the LAN terminals C1, C3, the relay terminal Cs, and a group of the group identifier "G2" consists of the LAN terminals C1, C2, C3. The above-mentioned processing is an example of the group creation function. In addition to this, the group participation function, the group escape function, and the group completion function are necessary. These functions are realized in the same way as the group creation function.

[An Example of Multicast Communication Using a Created Group]

Next, a communication method for the relay terminal Cs to multicast using the created group is explained. Assume that a user of one terminal inputs a sending request of information for group "G". In the one terminal, the user information processing section 101 supplies the sending request to the information sending section 114. The information sending section 114 retrieves the terminal identifiers of member terminals in the group "G" from the group information memory section 121. The terminal identifiers of member terminals are compared with the terminal identifiers stored in the communicatable terminal memory section 119 in order to examine the attribute of the member terminals. If LAN terminals are included in the member terminals, the sending information is supplied to the first sending section 111. If an IrDA terminal is included in the member terminals, the sending information is supplied to the infrared ray sending section 112. The group "G1" includes both an IrDA terminal and LAN terminals. Therefore, in this case, the sending information is supplied to the first sending section 111 and the infrared ray sending section 112.

[Receiving Processing of Information Addressed to Predetermined Group]

Next, in the case where the received information sending section 115 receives information addressed to group "G1", the processing is explained. For example, assume that the first receiving section 110 of the relay terminal Cs receives information from a LAN terminal. This information is supplied to the received information sending section 115 through the received information discrimination section 117. The received information sending section 115 retrieves the terminal identifiers of member terminals in group "G1" from the group information memory section 121. In this case, the destination address of the received information includes the relay terminal Cs because the group "G1" includes the member terminal Cs. Therefore, in the relay terminal Cs, the received information is supplied to the user information processing section 101. By referring to the group information memory section 121, the group "G1" includes IrDA terminal Cc as a member terminal. Therefore, in the relay terminal Cs, the received information is also supplied to the infrared ray sending section 112.

On the other hand, in the relay terminal Cs, assume that the infrared ray receiving section 113 receives information from the IrDA terminal. This information is supplied to the received information sending section 115 through the received information discrimination section 117. The received information sending section 115 retrieves the terminal identifiers of member terminals in group "G1" from the group information memory section 121. In this case, the destination address of the received information includes the relay terminal Cs because the group "G1" includes the member terminal Cs. Therefore, in the relay terminal Cs, the received information is supplied to the user information processing section 101. Furthermore, the group "G1" includes LAN terminals C1, C3 as member terminals. Therefore, the received information is also supplied to the first sending section 111.

As mentioned-above, in the fifth embodiment, the relay terminal Cs includes the registration function for the grouping and sending function to group member terminals. Therefore, even if the IrDA terminal Cc prepares a one-to-one communication function only, the IrDA terminal Cc can send a multicast communication through the relay terminal Cs.

(The Sixth Embodiment)

In the sixth embodiment, if the communication speed of one network (IrDA) is lower than the communication speed of another network (LAN), the processing of the relay terminal to improve traffic on the network is explained. In the same way as the fifth embodiment, construction of the relay terminal, IrDA terminal and LAN terminal are respectively shown in FIGS. 11, 12, 13. Each terminal consists of the user information processing section 101 and the communication control section 102. The communication control section 102 includes the first receiving section 110, the first sending section 111, the infrared ray sending section 112, the infrared ray receiving section 113, the information sending section 114, the received information sending section 115, the particular terminal identifier memory section 116, the received information discrimination section 117, the communicatable terminal discrimination section 118, the communicatable terminal memory section 119, the group set section 120, and the group information memory section 121. When transmitting information to the IrDA terminal whose communication speed is low, the transmission is completed by omitting a part of the information in order to reduce the traffic. For example, when set information is sent and received for an opposite terminal such as a group setting, this setting is completed by omitting a part of the information. In order to cope with this, the group set section 120 prepares the following function.

In the sixth embodiment, except for the attribute representing the kind of receiving section (IrDA, LAN), a "group operation attribute" for each terminal is set in the relay terminal. As the group operation attribute, "automatic mode" or "normal mode" are previously determined for the each terminal. In the automatic mode, the relay terminal receiving a group creation request (or the relay terminal as a group creation request side) automatically replies (or regards) in favor of the group creation request without receiving a reply from the member terminal of the automatic mode. As for the normal mode, in the same way as the fifth embodiment, the relay terminal receiving the group creation request (or the relay terminal as the group creation request side) sends a group creation request to the member terminal of the normal mode, and the member terminal of the normal mode replies with a group creation permission/rejection message to the relay terminal.

In case of a connection request, upon activation of a system or periodically, each terminal sends its own identifier and the group operation attribute. In the terminal of receiving side, the terminal identifier and the group operation attribute are stored in the communicatable terminal memory section 119. In this terminal, when a request of group creation is inputted by the user information processing section 101, the information sending section 114 refers the group operation attribute of the terminal identifier as a group member in the communicatable terminal memory section 119. As for the terminal whose group operation attribute is normal mode, the above-mentioned normal procedure is executed. As for the terminal whose group operation attribute is automatic mode, a group creation request is not sent to the terminal and this terminal is automatically regarded as if a group creation permission reply had been received from this terminal. (The group operation attribute may be set by unit of group creation function, group participation function, group escape function, group completion function.)

In each terminal, the group operation attribute is previously stored in the particular terminal identifier memory section 116. As mentioned-above, in case of connection request upon activation of the system or periodically, each terminal sends its own terminal identifier read from the particular terminal identifier memory section 116 to respective other terminals including the relay terminal. The relay terminal Cs (respective other terminal) recognizes the received terminal identifier with the kind of receiving section (IrDA, LAN) and registers this information in a table of the communicatable terminal memory section 119. In the relay terminal Cs, when the received information is transferred to another terminal or the information is sent to another terminal by a request of the user, the sending section (111, 112) is selected by referring to the table. In short, in the same way as in the second embodiment, the communicatable terminal memory section 119 stores the communicatable terminal identifier and the attribute of the kind of receiving section. In the sixth embodiment, the group operation attribute is additionally set to each terminal identifier according to the characteristic of communication section of each terminal. The group operation attribute ("automatic mode" or "normal mode") and the terminal identifier are previously stored in the particular terminal identifier memory section 116. The group operation attribute is additionally sent when sending the terminal identifier. Concretely speaking, in each terminal, when sending the information, the terminal identifier (ID) and the group operation attribute in the particular terminal identifier memory section 116 are supplied to the first sending section 111 or the infrared ray sending section 112 as terminal discrimination information. Therefore, the terminal ID and the group operation attribute of the terminal are sent to the other party terminals (the relay terminal), or may be periodically sent. In the receiving side terminal (the relay terminal), the communicatable terminal discrimination section 118 recognizes the terminal ID, the kind of the receiving section (IrDA, LAN) and the group operation attribute. This information is stored in the communicatable terminal memory section 119 to be referred to by the group set section 120, the received information sending section 115, and the information sending section 114. The group set section 120 prepares the same function as in the fifth embodiment, and retrieves the group operation attribute (automatic mode or normal mode) of the terminal ID as a group member from the communicatable terminal memory section 119. In response to a request for group creation, as for the terminal of the normal mode, the normal procedure of group creation is executed. As for the terminal of the automatic mode, a group creation request is not sent to the terminal and this terminal is automatically regarded as if a group creation permission reply has been received from this terminal. Accordingly, in response to the request of group creation, the group set section 120 retrieves the attribute of the kind of receiving section and the group operation attribute of the member terminal ID from the communicatable terminal memory section 119, and executes the processing of the group creation as a basic procedure or a partial omission procedure. In the system of the sixth embodiment, as for the terminal whose communication speed is low such as IrDA terminal, the automatic mode is set as the group operation attribute in order to reduce traffic on the IrDA network. As for the terminal whose communication speed is high such as a LAN terminal, the normal mode is set as the group operation attribute in order to execute the normal procedure.

[Processing Example When a Request for Group Creation is Generated in the Relay Terminal]

In situation of FIG. 5, assume that a user of the relay terminal Cs inputs a request of group creation whose group members are terminals Cs, Cc, C1, C3, and the communicatable terminal memory section in the relay terminal Cs previously stores a table shown in FIG. 16.

First, in the relay terminal Cs, the request of group creation is supplied from the user information processing section 101 to the group set section 120. The group set section 120 retrieves the attribute of kind of receiving section of the terminal ID of the group member from the communicatable terminal memory section 119. In FIG. 16, member terminal Cc is IrDA terminal and member terminals C1, C3 are LAN terminals. Next, the sending section (111, 112) of the relay terminal Cs is selected according to the attribute. However, in FIG. 16, the group operation attribute of IrDA terminal Cc is the automatic mode. Therefore the request of a group creation is supplied to the first sending section 111 only. Accordingly, the first sending section 111 sends the request of group creation to LAN terminals C1, C3. In the LAN terminals C1, C3, the first receiving section 110 receives the request of group creation. This request information is supplied to the received information sending section 115 through the received information description section 117, and is recognized as the group creation of group members Cs, Cc, C1, C3. The received information sending section 115 supplies this recognition result to the group set section 120. The group set section 120 creates group creation permission information to participate in the group or group creation rejection information not to participate in the group. This permission/rejection information is stored in the group information memory section 121. After storing the permission/rejection information, the information sending section 114 reads this information from the group information memory section 121 and supplies the permission/rejection information to the first sending section 111. The first sending section 111 sends the permission/rejection information with its own terminal identifier (C1, C3) as a group creation reply information. In the relay terminal Cs, the first receiving section 110 receives the group creation reply information. The group creation reply information is supplied to the received information sending section 115 through the received information discrimination section 117, and is recognized as the group creation permission/rejection of member terminals C1, C3. The received information sending section 115 supplies this recognition result to the group set section 120. The group set section 120 registers the terminal identifier of the group creation permission as the group member in the group information memory section 121. Then, the group set section 120 supplies a group identifier and the terminal identifiers of the group member as group creation result information to the first sending section 111 and the infrared ray sending section 112. The first sending section 111 and the infrared ray sending section 112 sends the group creation result information to the group member terminals or all of communicatable terminals. In each terminal which receives the group creation result information from the relay terminal Cs, the group creation result information is supplied to the group set section 120.

The group set section 120 recognizes the group identifier and the terminal identifiers of group member from the group creation result information, and registers the group identifier and the terminal identifiers in the group information memory section 121.

For example, if LAN terminals C1, C3 respectively reply with the group creation permission information to the relay terminal Cs, the relay terminal Cs assigns the group identifier "G1" to the group consisted of terminals "Cs, Cc, C1, C3". By multicasting this group creation result information to group member terminals, the group member terminals can recognize the creation of the new group. By broadcasting this group creation result information to all communicatable terminals, LAN terminal C2, as a non-group member, can also recognize the creation of the new group.

[Processing Example When a Request of Group Creation is Generated in a Terminal Except for the Relay Terminal]

Assume that the relay terminal Cs receives a request for group creation from the other terminal. First, a processing example when a LAN terminal sends the request for group creation is explained.

<In Case of Sending the Request for Group Creation from a LAN Terminal>

In situation of FIG. 5, assume that LAN terminal C1 sends the request for group creation whose group members are terminals Cs, Cc, C1, C3. In the relay terminal Cs, the first receiving section 110 receives the request of group creation. This request information is supplied to the received information sending section 115 through the received information discrimination section 117. The received information sending section 115 supplies the request information to the group set section 120. In response to this request, the group set section supplies a group creation permission information to the first sending section 111 of no objection. Before this processing, the group set section 120 retrieves the attribute of the kind of receiving section and the group operation attribute of the member terminal ID from the communicatable terminal memory section 119. In this case, IrDA terminal Cc, in automatic mode as the group operation attribute, is a member terminal of the group. Therefore, in case of sending group creation permission information, the group set section 120 of the relay terminal Cs supplies as a substitute a group creation permission information of IrDA terminal Cc to the first sending section 111. The first sending section 111 sends the group creation permission information of the relay terminal Cs and IrDA terminal Cc to LAN terminal C1. Accordingly, LAN terminal C1 recognizes a permission reply of group creation of the relay terminal Cs and IrDA terminal Cc.

On the other hand, if the relay terminal Cs sends group creation rejection information of its own terminal, the relay terminal Cs supplies as a substitute a group creation rejection information of the IrDA terminal Cc to the first sending section 111. The first sending section 111 sends the group creation rejection information of the relay terminal Cs and the group creation rejection information of IrDA terminal Cc. Accordingly, the LAN terminal C1 recognizes the group creation rejection reply of the relay terminal Cs and IrDA terminal Cc.

In this way, if the IrDA terminal is included in the group as a group member in the request of group creation from LAN terminal, the relay terminal sends as a substitute the group creation permission/rejection information of the IrDA terminal. Accordingly, the processing of a group creation IrDA communication function whose communication speed is low is not used. Originally, when receiving a request of group creation from a LAN terminal, the relay terminal transfers the request of group creation to the IrDA terminal, receives a group creation permission/rejection information from the IrDA terminal, and sends the group creation permission/rejection information to the LAN terminal. However, in the sixth embodiment, the relay terminal directly sends the group creation permission/rejection information of the IrDA terminal to the LAN terminal without communication with the IrDA terminal. Therefore, the processing of group creation is executed without IrDA communication.

When the LAN terminal receives the group creation permission/rejection information from each terminal as group member terminal in the request of group creation, the LAN terminal sets a group identifier for the group consisting of the terminals of the group creation permission information. For example, when the group set section 120 of the LAN terminal C1 receives the group creation permission/rejection information set by the relay terminal Cs, the group set section 120 registers the terminal identifiers of the terminals which replied to the group creation permission information as group members in the group information memory section 121. Then, the group set section 120 sets a group identifier to discriminate the group, and sends the group identifier and the member terminal identifiers as the group creation result information to the member terminals or all communicatable terminals. In the terminals Cs, C3 as the receiving side, the group creation result information is supplied to the group set section 120 through the received information sending section 115. The group set section 120 recognizes the creation of the new group and registers this group information (group identifier and member terminal identifiers) in the group information memory section 121. When the relay terminal Cs sends other information to the IrDA terminal Cc, the relay terminal Cs additionally sends the group creation result information to the IrDA terminal Cc. Otherwise, when the relay terminal Cs receives the group creation result information from the LAN terminal C1, the relay terminal may transfer the group creation result information to the IrDA terminal Cc. As a result, the IrDA terminal Cc can receive the group creation result information. In the IrDA terminal Cc, the group creation result information is supplied to the group set section 120 through the received information sending section 115. The group set section 120 recognizes the creation of the new group from the group creation result information, and registers this recognition result in the group information memory section 121. Furthermore, a group participation function, a group escape function, and a group completion function are realized in same way as the group creation function.

As mentioned-above, when the relay terminal receives a request of group creation from a LAN terminal, the attribute of the kind of receiving section of a member terminal is retrieved from the communicatable terminal memory section 119. If the IrDA terminal is included in the group as member terminal, the relay terminal substitutely sends a response of the IrDA terminal to the LAN terminal. As for substitute responses, if the relay terminal sends a group creation permission response of its own terminal, the relay terminal sends as a substitute a group creation permission response of the IrDA terminal. If the relay terminal sends a group creation rejection response of its own terminal, the relay terminal sends as a substitute a group creation rejection response of the IrDA terminal. Accordingly, the processing of group creation is executed without communication of the IrDA network.

<In Case of Sending the Request for Group Creation from an IrDA Terminal>

In situation of FIG. 5, assume that IrDA terminal Cc sends a request for group creation whose group members are Cs, Cc, C1, C3. In IrDA terminal Cc, the infrared ray sending section 112 sends the request for group creation as an infrared ray signal. In the relay terminal Cs, the infrared ray receiving section 113 receives the request for group creation from the terminal Cc. This request information is supplied to the received information sending section 115 through the received information discrimination section 117. The received information sending section 115 supplies the request information to the group set section 120. The group set section 120 retrieves the attribute of the kind of receiving section of the group creation request terminal (Cc) from the communicatable terminal memory section 119. In this case, the attribute is IrDA. Therefore, the group set section 120 supplies a request for group creation for LAN terminals C1, C3 to the first sending section 111. The first sending section 111 sends the request of group creation to LAN terminals C1, C3. In response to the request for group creation, LAN terminals C1, C3 send group creation permission/rejection information to the relay terminal Cs. In the relay terminal Cs, the first receiving section 110 receives the group creation permission/rejection information from LAN terminals C1, C3. Assume that the group creation permission information is received from LAN terminals C1, C3. In this case, the relay terminal Cs multicasts the group creation result information to member terminals Cc, C1, C3 of the group, or broadcasts the group creation result information to all communicatable terminals. Furthermore, a group participation function, and a group escape function, a group completion function are realized in same way as the group creation function.

In this way, when the relay terminal receives a request for group creation from another terminal, the relay terminal retrieves the attribute of the kind of receiving section of the group creation request terminal and the member terminals from the communicatable terminal memory section. If the attribute of the group creation request terminal is "IrDA", the relay terminal Cs sends a request for group creation to member terminals C1 and C3, and waits for the group creation permission/rejection information from the member terminals C1 and C3. Accordingly, when the communication speed of one network (For example: IrDA) is lower than communication speed of another network (For example: LAN), the quantity of control information on the one network is greatly reduced.

(The Seventh Embodiment)

As mentioned-above, when the communication speed of one network (IrDA) is lower than the communication speed of other network (LAN), information regarding the group to which the IrDA terminal belongs is transmitted to other communicatable terminals while the quantity of control information on the one network (IrDA) is reduced. In the seventh embodiment, even if another terminal is newly included in the network, the group information is transmitted to the other communicatable terminals without difficulty.

Figure 17:
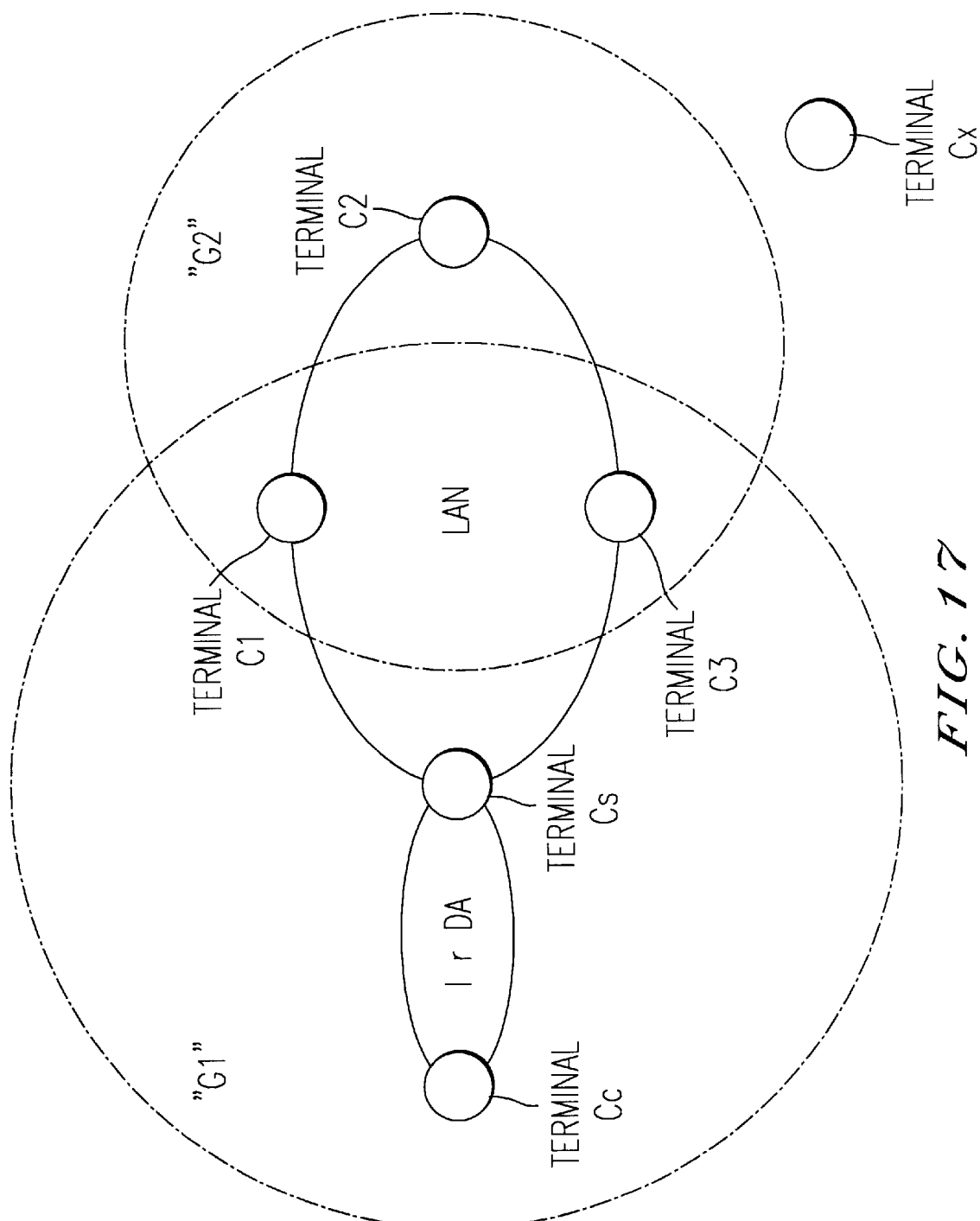
FIG. 17 is a schematic diagram illustrating a created group according to a seventh embodiment of the present invention.

In the same way as in the fifth and sixth embodiments, FIG. 11 is a block diagram of the relay terminal of the seventh embodiment; FIG. 12 is a block diagram of IrDA terminal of the seventh embodiment; FIG. 13 is a block diagram of a LAN terminal of the seventh embodiment. Each terminal is comprised of the user information processing section 101 and the communication control section 102. In the seventh embodiment, in the same way as in the fifth embodiment, processings of the first sending section 111 and the infrared ray sending section 112 are mainly explained after creating two groups "G1, G2" as shown in FIG. 17. In FIG. 17, the first group of the group identifier "G1" is formed by IrDA terminal Cc, the relay terminal Cs, and LAN terminals C1, C3, and the second group of the group identifier "G2" is formed by LAN terminals C1, C2, and C3. In this situation, assume that other terminal Cx is newly included in this network. The other terminal Cx prepares a construction of FIGS. 12 or 13 (IrDA terminal or LAN terminal) and includes functions of the fifth embodiment.

In FIG. 17, as for the relay terminal Cs, the first sending section 111 periodically sends its own identifier (Cs) with the group information registered in the group information memory section 121 as communication terminal information to a LAN terminal. In the same way, the infrared ray sending section 112 periodically sends its own identifier (Cs) with the group information as the communication terminal information to the IrDA terminal. By receiving the communication terminal information, each terminal (Cc, C1, C2, C3) can recognize the present status of the group. In this place, in the communication system, each terminal periodically sends its own identifier.

After a predetermined time, assume that another terminal Cx is newly included in the network as shown in FIG. 17. In this case, the other terminal Cx receives the identifier periodically sent by each terminal in the network. In the same way as in the second embodiment, in the other terminal Cx, the communicatable terminal discrimination section 118 recognizes the identifier of the communicatable terminal and the attribute of the kind of receiving section (LAN or IrDA), and registers this information in the communicatable terminal memory section 119. As mentioned-above, in the relay terminal Cs, the first sending section 111 periodically sends its own identifier (Cs) with the group information stored in the group information memory section 121 to the LAN terminal and the infrared ray sending section 112 periodically sends its own identifier (Cs) with the group information stored in the group information memory section 121 to the IrDA terminal. In the other terminal Cx, after receiving this communication terminal information (the identifier and the group information), this communication terminal information is supplied to the group set section 120 through the received information sending section 115. The group set section 120 recognizes the group identifier and the member terminal identifiers from the group information, and registers this information in the group information memory section 121.

In this way, by receiving the communication terminal information sent by the relay terminal Cs, the other terminal Cx can obtain the present status of the group. Furthermore, as mentioned-above, the relay terminal Cs sends as a substitute the identifier of IrDA terminal in case the IrDA terminal is a member terminal of the group stored in the group information memory section 121. Therefore, in this case, the other terminal Cx can exactly recognize the present status of the group.

A memory can be used to store instructions for performing the processes described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A communication terminal apparatus used in a communication system including at least one first terminal having an optical communication means for optically communicating and for sending an identifier to discriminate the at least one first terminal, and at least one second terminal having a network communication means for communicating with a plurality of other second terminals through a network and for sending an identifier to discriminate the at least one second terminal, said communication terminal apparatus being a relay terminal to communicate between the first terminal and the second terminal, comprising:

optical communication means for optically sending and receiving information with respect to the at least one first terminal;

network communication means for sending and receiving information with respect to the at least one second terminal through the network;

identifier sending means for sending an identifier to discriminate the relay terminal through said optical communication means and said network communication means;

communicatable terminal discrimination means for discriminating the terminal communicatable with the relay terminal according to identifiers received from said optical communication means and said network communication means;

communicatable terminal memory means for storing the identifiers of the communicatable terminals and an attribute representing the kind of said communication means from which each identifier is received; and received information sending means for comparing a destination identifier of received information with the identifiers stored in said communicatable terminal memory means, and for supplying the received information to said optical communication means or said network communication means according to the attribute of the identifier matched with the destination identifier.

2. The communication terminal apparatus according to claim 1, wherein said optical communication means includes an infrared ray sending means and an infrared ray receiving means, and wherein said network communication means includes a network sending means and a network receiving means.

3. The communication terminal apparatus according to claim 1, further comprising a user information processing means for processing the received information if the destination identifier of the received information is matched with the identifier of the relay terminal.

4. The communication terminal apparatus according to claim 3, further comprising an information sending means for comparing a destination identifier of sending information with the identifiers stored in said communicatable terminal memory means if the sending information is supplied from said user information processing means, and for supplying the sending information to said optical communication means or said network communication means according to the attribute of the identifier matched with the destination identifier.

5. The communication terminal apparatus according to claim 3, further comprising a group set means for setting the identifiers stored in said communicatable terminal memory means as each member of one group if the terminals of the identifiers are indicated as the one group and permission information for group creation is received from the terminals, and a group information memory means for storing group information consisting of a group identifier and the terminal identifiers set by said group set means.

6. The communication terminal apparatus according to claim 5, wherein said group set means broadcasts the group identifier and the terminal identifiers as group creation result information to the terminals as each member of the group through said optical communication means and said network communication means.

7. The communication terminal apparatus according to claim 6, wherein said group set means periodically sends the group creation result information and the identifier of the relay terminal through said network communication means.

8. The communication terminal apparatus according to claim 5, wherein said group set means sets the identifier of a terminal as a member of one group without the permission information for group creation from the terminal, if a group operation attribute of permission is previously received from the terminal.

9. The communication terminal apparatus according to claim 8, wherein said group set means sends a request for group creation to the second terminals as members of the group through said network communication means, if the request for group creation is inputted from said user information processing means of the relay terminal and the group operation attribute of permission is previously received from the first terminal as the member of the group.

10. The communication terminal apparatus according to claim 8, wherein said group set means sends a response for group creation including the permission information of the first terminal as the member of the group to the second terminal through said network communication means, if the request for group creation is received from the second terminal and the group operation attribute of permission is previously received from the first terminal.

11. The communication terminal apparatus according to claim 8, wherein said group set means sends a request for group creation to the second terminals as members of the group through said network communication means, if the request for group creation is received from the first terminal.

12. The communication terminal apparatus according to claim 1, wherein said received information sending means sends a substitute identifier of the first terminal received from said optical communication means to the second terminal through said network communication means when the identifier of the relay terminal or the sending information is sent from said network communication means.

13. The communication terminal apparatus according to claim 1, wherein said received information sending means sends a substitute identifier of the second terminal received from said network communication means to the first terminal through said optical communication means when the identifier of the relay terminal or the sending information is sent from said optical communication means.

14. A method for controlling a relay terminal used in a communication system including at least one first terminal having an optical communication means for optically communicating and at least one second terminal having a network communication means for communicating with a plurality of other second terminals through a network, each terminal sending an identifier to discriminate its own terminal, comprising the steps of:

optically communicating with the at least one first terminal;

communicating with the at least one second terminal through the network;

discriminating the terminal communicatable with the relay terminal according to identifiers received from the first terminal and the second terminal;

storing the identifiers of the communicatable terminals and an attribute representing the kind of communication from which each identifier is received;

comparing a destination identifier of information received from the first terminal or the second terminal with the stored identifiers; and supplying the received information to the first terminal or the second terminal according to the attribute of the stored identifier matched with the destination identifier.

15. The method for controlling a relay terminal according to claim 14, further comprising the step of:

processing the received information if the destination identifier of the received information matches the identifier of the relay terminal.

16. The method for controlling a relay terminal according to claim 15, further comprising the steps of:

comparing a destination identifier of sending information with the stored identifiers if the sending information is supplied at the step of processing; and supplying the sending information by optical-communication or network-communication according to the attribute of the stored identifier matched with the destination identifier.

17. The method for controlling a relay terminal according to claim 15, further comprising the steps of:

setting the stored identifiers as each member of one group if the terminals of the identifiers are indicated as the one group and permission information for group creation is received from the terminals, and storing group information consisting of a group identifier and the terminal identifiers set at the step of setting.

18. The method for controlling a relay terminal according to claim 17, further comprising the step of:

broadcasting the group identifier and the terminal identifiers as group creation result information to the terminals as each member of the group by the network and the optical-communication.

19. The method for controlling a relay terminal according to claim 18, further comprising the step of:

periodically sending the group creation result information and the identifier of the relay terminal by the network.

20. The method for controlling a relay terminal according to claim 17, further comprising the step of:

setting the identifier of a terminal as a member of one group without the permission information for group creation from the terminal, if a group operation attribute of permission is previously received from the terminal.

21. The method for controlling a relay terminal according to claim 20, further comprising the step of:

sending a request for group creation to the second terminal as the member of the group through the network, if the request for group creation is inputted at the step of processing of the relay terminal and the group operation attribute of permission is previously received from the first terminal as the member of the group.

22. The method for controlling a relay terminal according to claim 20, further comprising the step of:

sending a response for group creation including the permission information of the first terminal as the member of the group to the second terminal by the network, if the request for group creation is received from the second terminal and the group operation attribute of permission is previously received from the first terminal.

23. The method for controlling a relay terminal according to claim 20, further comprising the step of:

sending a request for group creation to the second terminals as the member of the group by the network, if the request for group creation is received from the first terminal.

24. The method for controlling a relay terminal according to claim 14, further comprising the step of:

sending a substitute identifier of the first terminal received at the step of optically communicating to the second terminal through the network when the identifier of the relay terminal or the sending information is sent through the network.

25. The method for controlling a relay terminal according to claim 14, further comprising the step of:

sending a substitute identifier of the second terminal received at the step of communicating by the network to the first terminal by the optical-communication when the identifier of the relay terminal or the sending information is sent by the optical-communication.

26. A computer readable memory containing computer readable instructions to control a relay terminal used in a communication system including at least one first terminal having an optical communication means for optically communicating and at least one second terminal having a network communication means for communicating with a plurality of other second terminals through a network, each terminal sending an identifier to discriminate its own terminal, comprising:

instruction means for causing a computer to optically communicate with the at least one first terminal;

instruction means for causing a computer to communicate with the at least one second terminal through the network;

instruction means for causing a computer to discriminate the terminal communicatable with the relay terminal according to identifiers received from the first terminal and the second terminal;

instruction means for causing a computer to store the identifiers of the communicatable terminals and an attribute representing the kind of communication from which each identifier is received;

instruction means for causing a computer to compare a destination identifier of information received from the first terminal or the second terminal with the stored identifiers; and instruction means for causing a computer to supply the received information to the first terminal or the second terminal according to the attribute of the stored identifier matched with the destination identifier.

27. A communication terminal apparatus used in a communication system including at least one first terminal having an optical communication unit configured to optically communicate and send an identifier to discriminate the at least one first terminal, and at least one second terminal having a network communication unit configured to communicate with a plurality of other second terminals through a network and send an identifier to discriminate the at least one second terminal, said communication terminal apparatus being a relay terminal to communicate between the first terminal and the second terminal, comprising:

an optical communication unit configured to optically send and receive information with respect to the at least one first terminal;

a network communication unit configured to send and receive information with respect to the at least one second terminal through the network;

an identifier sending unit configured to send an identifier to discriminate the relay terminal through said optical communication unit and said network communication unit;

a communicatable terminal discrimination unit configured to discriminate the terminal communicatable with the relay terminal according to identifiers received from said optical communication unit and said network communication unit;

a communicatable terminal memory configured to store the identifiers of the communicatable terminals and an attribute representing the kind of said communication unit from which each identifier is received; and a received information sending unit configured to compare a destination identifier of received information with the identifiers stored in said communicatable terminal memory, and to supply the received information to said optical communication unit or said network communication unit according to the attribute of the identifier matched with the destination identifier.

* * * * *